US011925516B2

(12) United States Patent
Matoba et al.

(10) Patent No.: US 11,925,516 B2
(45) Date of Patent: Mar. 12, 2024

(54) DENTAL TREATMENT APPARATUS AND METHOD OF DRIVING THE SAME

(71) Applicant: J. MORITA MFG. CORP., Kyoto (JP)

(72) Inventors: Kazunari Matoba, Kyoto (JP); Kyohei Kato, Kyoto (JP)

(73) Assignee: J. MORITA MFG. CORP., Kyoto (JP)

( * ) Notice: Subject to any disclaimer, the term of this patent is extended or adjusted under 35 U.S.C. 154(b) by 252 days.

(21) Appl. No.: 16/598,335

(22) Filed: Oct. 10, 2019

(65) Prior Publication Data

US 2020/0155269 A1     May 21, 2020

(30) Foreign Application Priority Data

Nov. 19, 2018    (JP) .................................. 2018-216602

(51) Int. Cl.
*A61C 1/00*      (2006.01)
*A61C 1/18*      (2006.01)
*A61C 5/42*      (2017.01)

(52) U.S. Cl.
CPC .............. *A61C 1/003* (2013.01); *A61C 1/186* (2013.01); *A61C 5/42* (2017.02)

(58) Field of Classification Search
CPC ....... A61C 1/003; A61C 1/186; A61C 1/0007; A61C 5/40; A61C 5/42; A61C 17/221; A61C 19/041; A61C 19/042
See application file for complete search history.

(56) References Cited

U.S. PATENT DOCUMENTS

| 9,827,069 | B2 * | 11/2017 | Kunisada | ................. A61C 5/40 |
| 2002/0182564 | A1 | 12/2002 | Katsuda et al. | |
| 2008/0241783 | A1 * | 10/2008 | Yamashita | ........... A61C 19/042 |
| | | | | 433/72 |
| 2008/0254404 | A1 * | 10/2008 | Heraud | ................ A61C 1/0007 |
| | | | | 433/27 |

(Continued)

FOREIGN PATENT DOCUMENTS

| CN | 1383793 A | 12/2002 |
| CN | 203001146 U | 6/2013 |

(Continued)

OTHER PUBLICATIONS

Extended European Search Report issued in European Application No. 19205072.2, dated Jan. 29, 2020 (8 pages).

(Continued)

*Primary Examiner* — Edward Moran
(74) *Attorney, Agent, or Firm* — Osha Bergman Watanabe & Burton LLP

(57) ABSTRACT

A root canal treatment instrument 100 continues drive of a cutting tool 5 in forward rotation drive until reaching 180 degrees, and when a load applied to the cutting tool 5 is equal to or greater than a reference load, drive of the cutting tool 5 is switched to reverse rotation drive until reaching 90 degrees. In the root canal treatment instrument 100, when a cumulative amount of rotation is equal to or greater than a reference amount of rotation, change to a drive pattern is made, forward rotation drive is continued until reaching 90 degrees, and when a load applied to the cutting tool 5 is equal to or greater than the reference load, drive of the cutting tool 5 is switched to reverse rotation drive until reaching 180 degrees.

18 Claims, 14 Drawing Sheets

(56) References Cited

U.S. PATENT DOCUMENTS

| | | | |
|---|---|---|---|
| 2014/0318287 A1 | 10/2014 | Eder et al. | |
| 2015/0086937 A1 | 3/2015 | Katsuda et al. | |
| 2015/0216623 A1* | 8/2015 | Yared | A61C 1/06 433/125 |
| 2017/0265961 A1* | 9/2017 | Kato | A61C 5/40 |
| 2020/0222160 A1 | 7/2020 | Zhou | |

FOREIGN PATENT DOCUMENTS

| | | |
|---|---|---|
| CN | 106974736 A | 7/2017 |
| CN | 109662792 A | 4/2019 |
| DE | 102015114553 A1 | 3/2017 |
| EP | 2805687 A1 | 11/2014 |
| EP | 2851035 A1 | 3/2015 |
| EP | 3338727 A1 | 6/2018 |
| EP | 3677215 A1 | 7/2020 |
| JP | 3264607 B2 | 3/2002 |
| JP | 2003-019143 A | 1/2003 |
| JP | 2013172838 A | 9/2013 |
| JP | 2015-083116 A | 4/2015 |
| JP | 2016-198191 A | 12/2016 |

OTHER PUBLICATIONS

Office Action issued in the counterpart Chinese Patent Application No. 201911128924.9, dated Mar. 2, 2021 (19 pages).

Office Action issued in the counterpart Japanese Patent Application No. 2018-216602, dated May 11, 2021 (13 pages).

Office Action issued in the counterpart European Patent Application No. 19205072.2, dated May 26, 2021 (5 pages).

Office Action issued in Chinese Application No. 201911128924.9; dated Oct. 21, 2021 (22 pages) .

* cited by examiner

FIG.3
MAGNITUDE OF FRACTURE ANGLE (DEGREE)

|   | #15   | #20 | #25   | #30   | #35   | #40 |
|---|-------|-----|-------|-------|-------|-----|
| A | 750   | 660 | 630   | 510   | 480   | 520 |
| B | 640   | 470 | 810   | 560   | 640   | 490 |
| C | 1,210 | 930 | 770   | 780   | 940   | 680 |
| D | 1,110 | 940 | 850   | 770   | 960   | 850 |
| E | 840   | 510 | 380   | 1,000 | 940   | 830 |
| F | 1,000 |     | 1,030 |       | 1,030 |     |

FIG.4
MAGNITUDE OF BREAKING TORQUE (g·cm)

|   | #15 | #20 | #25 | #30 | #35 | #40 |
|---|-----|-----|-----|-----|-----|-----|
| A | 11  | 19  | 33  | 54  | 70  | 81  |
| B | 19  | 24  | 32  | 66  | 97  | 142 |
| C | 14  | 27  | 35  | 66  | 84  | 122 |
| D | 18  | 22  | 34  | 41  | 78  | 99  |
| E | 21  | 26  | 46  | 54  | 76  | 87  |
| F | 19  |     | 31  |     | 88  |     |

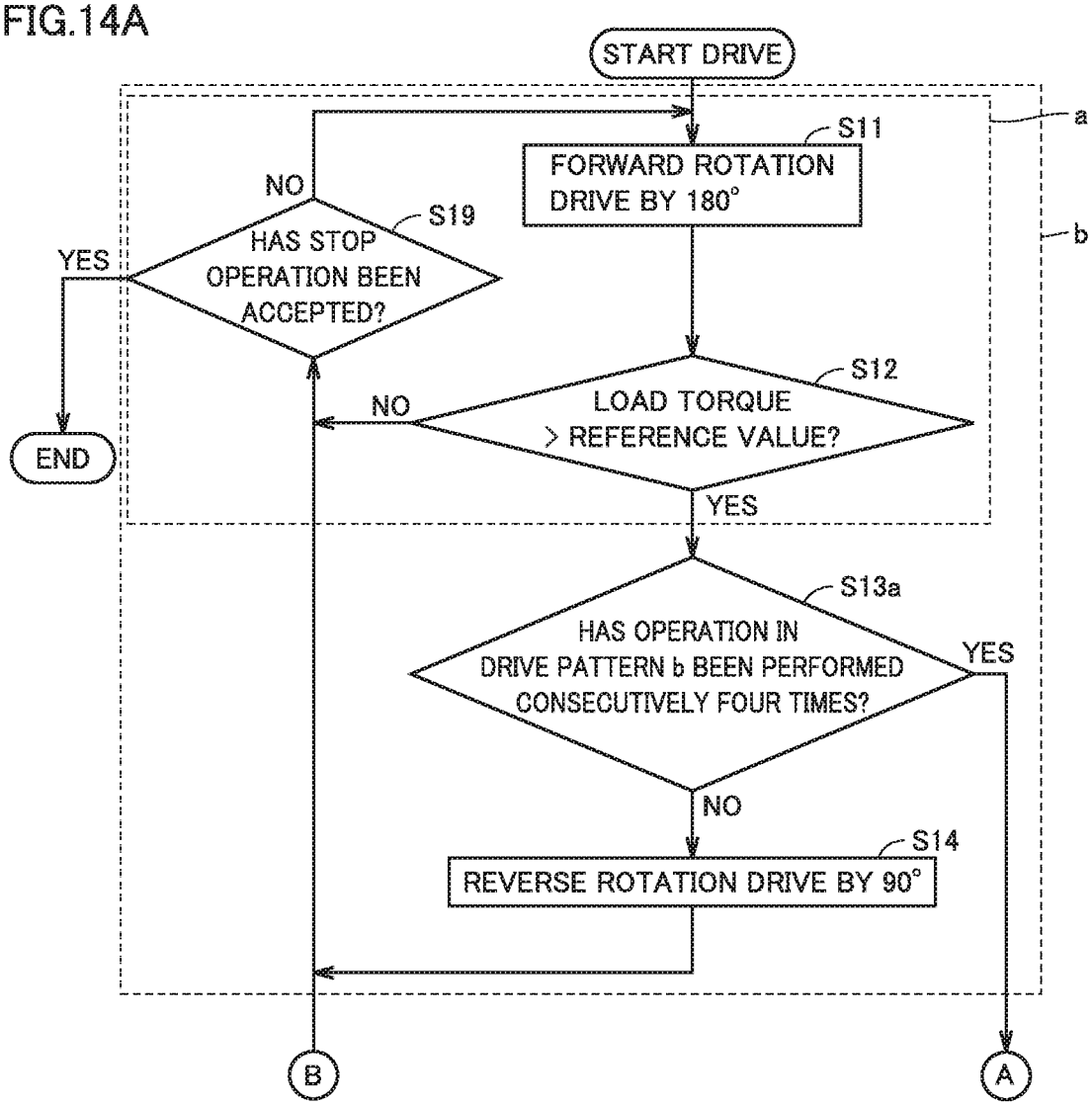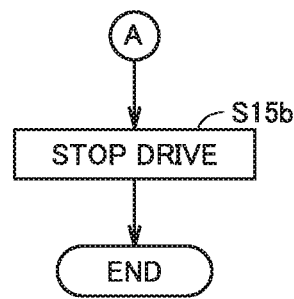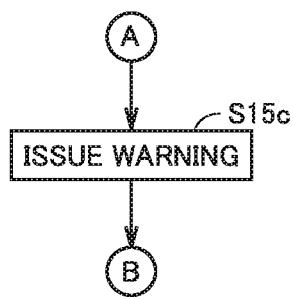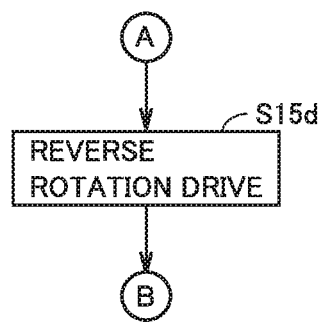

DENTAL TREATMENT APPARATUS AND METHOD OF DRIVING THE SAME

BACKGROUND OF THE INVENTION

Field of the Invention

The present invention relates to a dental treatment apparatus in which a cutting tool is held in a head of a handpiece and particularly to a dental treatment apparatus cutting an inner wall of a root canal of a tooth and enlarging the root canal and a method of driving the same.

Description of the Background Art

In dental treatment, treatment for cutting and enlarging a root canal of a tooth may be performed. In the treatment, a dental treatment apparatus in which a cutting tool called a file or a reamer is attached to a head of a handpiece is used and a root canal of a tooth is cut and enlarged by driving the cutting tool. Various types of control are available as control for the dental treatment apparatus to drive the cutting tool to cut and enlarge a root canal of a tooth. For example, Japanese Patent No. 3264607 discloses control of drive of a cutting tool.

In a dental treatment apparatus disclosed in Japanese Patent No. 3264607, rotation of a cutting tool is controlled to forward rotation (right and clockwise rotation) or reverse rotation (left and counterclockwise rotation) by driving a motor to rotate forward or backward in accordance with a state of a rotation direction switch. The dental treatment apparatus disclosed in Japanese Patent No. 3264607 includes a load torque detection resistor detecting a load applied to the cutting tool. When the detected load reaches a reference set in advance, the motor is switched from forward rotation to reverse rotation and rotation of the cutting tool is controlled from forward rotation to reverse rotation.

SUMMARY OF THE INVENTION

In the dental treatment apparatus disclosed in Japanese Patent No. 3264607, when a load applied to the cutting tool is greater than the reference set in advance, rotation of the cutting tool is switched from forward rotation to reverse rotation so as to eliminate bite of a cutting edge of the cutting tool into a wall of the root canal. Therefore, in the dental treatment apparatus in Japanese Patent No. 3264607, the load applied to the cutting tool is lowered by eliminating bite of the cutting edge of the cutting tool so that fracture of the cutting tool is prevented.

When the set reference is large, however, rotation of the cutting tool cannot be switched from forward rotation to reverse rotation even though a high load is applied to the cutting tool, and forward rotation drive of the cutting tool is continued while the cutting edge of the cutting tool is bitten in the wall of the root canal. Therefore, in the dental treatment apparatus in Japanese Patent No. 3264607, the cutting tool is fractured by forward rotation drive of the cutting tool beyond an angle of break of the cutting tool.

When the set reference is small, on the other hand, rotation of the cutting tool is soon switched from forward rotation to reverse rotation even by application of a low load to the cutting tool. Even though bite of the cutting edge of the cutting tool in the wall of the root canal can be eliminated, reverse rotation drive in which the wall of the root canal cannot be cut is frequently repeated. Therefore, though the dental treatment apparatus in Japanese Patent No. 3264607 can prevent fracture of the cutting tool, a ratio of reverse rotation drive during drive of the cutting tool is high and efficiency in cutting is lowered.

The present invention was made to solve the problems above, and an object thereof is to provide a dental treatment apparatus configured to drive a cutting tool, the dental treatment apparatus being capable of preventing fracture of the cutting tool while lowering in efficiency in cutting is suppressed, and a method of driving the same.

A dental treatment apparatus according to the present invention includes a drive unit, a control unit, a load detector, and a cumulative rotation amount calculator. The drive unit is capable of forward rotation drive in which a cutting tool held by a head of a handpiece is rotated in a cutting direction and reverse rotation drive in which the cutting tool is rotated in a non-cutting direction. The control unit is configured to control the drive unit configured to drive the cutting tool. The load detector is configured to detect a load applied to the cutting tool. The cumulative rotation amount calculator is configured to calculate a cumulative amount of rotation which represents accumulation for each rotation direction, of amounts of rotation of the cutting tool driven by the drive unit while drive with the forward rotation drive and the reverse rotation drive being repeated is carried out. The control unit is configured to continue drive of the cutting tool in the forward rotation drive until reaching a predetermined first amount of rotation regardless of a result obtained by the load detector. When the load applied to the cutting tool and detected by the load detector in the forward rotation drive of the cutting tool up to the first amount of rotation is equal to or greater than a reference load, the control unit is configured to switch drive of the cutting tool to the reverse rotation drive until reaching a predetermined second amount of rotation. When the cumulative amount of rotation calculated by the cumulative rotation amount calculator is equal to or greater than a reference amount of rotation while drive with the forward rotation drive and the reverse rotation drive being repeated is carried out, the control unit is configured to carry out predetermined control for eliminating twist of the cutting tool.

A method of driving a dental treatment apparatus according to the present invention is a method of driving a dental treatment apparatus including a drive unit configured to drive a cutting tool held by a head of a handpiece. The drive unit is capable of forward rotation drive in which a cutting tool held by the head is rotated in a cutting direction and reverse rotation drive in which the cutting tool is rotated in a non-cutting direction. The control unit is configured to control the drive unit configured to drive the cutting tool and to continue drive of the cutting tool in the forward rotation drive until reaching a predetermined first amount of rotation regardless of a result obtained by a load detector configured to detect a load applied to the cutting tool. When the load applied to the cutting tool and detected by the load detector in the forward rotation drive of the cutting tool up to the first amount of rotation is equal to or greater than a reference load, the control unit is configured to switch drive of the cutting tool to the reverse rotation drive until reaching a predetermined second amount of rotation. The control unit is configured to change to a drive pattern when a cumulative amount of rotation which represents accumulation of amounts of rotation of the cutting tool is equal to or greater than a reference amount of rotation while drive with the forward rotation drive and the reverse rotation drive being repeated is carried out. In the changed drive pattern, the control unit is configured to continue drive of the cutting tool in the forward rotation drive regardless of the result obtained by the load detector until reaching a predetermined third amount of rotation. When the load applied to the cutting tool and detected by the load detector in the forward rotation drive of the cutting tool up to the third amount of rotation is equal to or greater than the reference load, the control unit is configured to switch drive of the cutting tool to the reverse rotation drive until reaching a predetermined fourth amount of rotation greater than the third amount of rotation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram for illustrating relation of a manufacturer and a diameter with a fracture angle of a cutting tool.

FIG. 4 is a diagram for illustrating relation of a manufacturer and a diameter with breaking torque of a cutting tool.

FIGS. 14A to 14D are each a flowchart for illustrating drive of the root canal treatment instrument according to a modification of the present second embodiment.

DESCRIPTION OF THE PREFERRED EMBODIMENTS (Summary)

Figure 1:
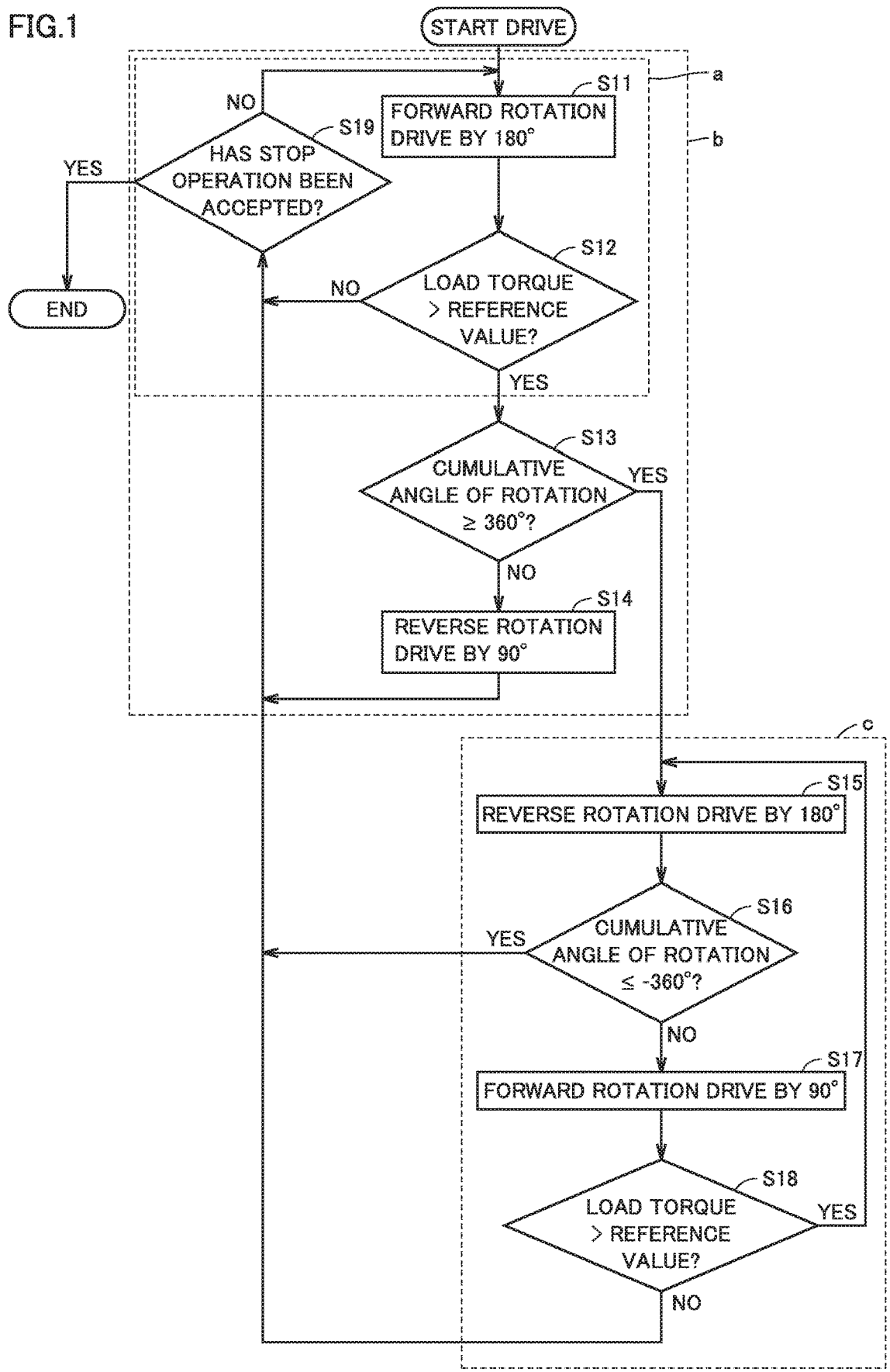
FIG. 1 is a flowchart for illustrating drive of a root canal treatment instrument according to the present first embodiment.

Treatment for cutting and enlarging a root canal of a tooth is very difficult because a degree of curve of a root canal or a condition of calcification and clogging of the root canal is different from person to person. In cutting and enlarging a root canal with the use of a root canal treatment instrument representing a dental treatment apparatus, possible mechanisms of fracture of a cutting tool mainly include fracture due to cycle fatigue, fracture due to torsional fatigue, and fracture due to combination of such fatigue. In particular, fracture due to torsional fatigue (which is also simply referred to below as torsional fracture) is a fracture phenomenon of a cutting tool caused by being twisted as a result of bite of a cutting edge of the cutting tool into a wall of a root canal and forced rotation of the cutting tool with the cutting tool being restrained in the portion of bite.

An angle at which a cutting tool is fractured as being twisted from this state of restraint (which is also simply referred to as a fracture angle below) is different depending on a material or a shape of the cutting tool. So long as the same cutting tool is driven within a range of angles smaller than the fracture angle, torsional fracture is less likely to occur. In addition, so long as a cutting tool is driven within a range of reference angles of rotation smaller than the smallest fracture angle of cutting tools to be used in a root canal treatment instrument, torsional fracture is less likely to occur. Fracture of a cutting tool due to torsional fracture can be prevented by setting a reference angle of rotation so as not to exceed a fracture angle. Specifically, the reference angle of rotation is set based on a fracture angle in accordance with a type of a cutting tool to be used for a root canal treatment instrument or a smallest fracture angle of cutting tools to be used in a root canal treatment instrument. For example, when a fracture angle of a certain cutting tool is set to 470 degrees, 360 degrees is set as the reference angle of rotation in consideration of a margin. The reference angle of rotation refers to an amount analyzed and set by each manufacturer based on a fracture angle of the cutting tool and may be set to an angle smaller than or approximately half the fracture angle of the cutting tool.

When the cutting tool is driven to rotate forward while the cutting edge of the cutting tool is bitten in the wall of the root canal and the cutting tool is restrained, a load applied to the cutting tool increases. For the root canal treatment instrument, when the load applied to the cutting tool is equal to or greater than a reference value (reference load), drive for reverse rotation drive of the cutting tool for eliminating bite of the cutting edge of the cutting tool is carried out. By setting the reference value not to greatly exceed a load (breaking torque) at which the cutting tool may be broken, fracture of the cutting tool due to torsional fracture can be prevented. Specifically, the reference value is set based on breaking torque in accordance with a type of the cutting tool to be used in the root canal treatment instrument or smallest breaking torque of cutting tools to be used in the root canal treatment instrument. For example, when breaking torque of a certain cutting tool is 54 g·cm, 50 g·cm is set as the reference value in consideration of a margin.

When the set reference value is small, however, in the root canal treatment instrument, rotation of the cutting tool is soon switched from forward rotation to reverse rotation even by application of a low load to the cutting tool. Even though bite of the cutting edge of the cutting tool in the wall of the root canal can be eliminated, reverse rotation drive in which the wall of the root canal cannot be cut is frequently repeated. Therefore, though the root canal treatment instrument can prevent fracture of the cutting tool, a ratio of reverse rotation drive during drive of the cutting tool is high and efficiency in cutting is lowered.

In contrast, when the set reference value is large, rotation of the cutting tool cannot be switched from forward rotation to reverse rotation even though a high load is applied to the cutting tool, and forward rotation drive of the cutting tool is continued while the cutting edge of the cutting tool is bitten in the wall of the root canal. Therefore, the root canal treatment instrument drives the cutting tool to rotate forward beyond the angle of break of the cutting tool while the load equal to or greater than breaking torque is applied to the cutting tool, and hence fracture of the cutting tool cannot be prevented.

For the root canal treatment instrument according to the present invention, a reference value in accordance with breaking torque of the cutting tool is set and then drive is controlled such that a cumulative angle of rotation (accumulation of amounts of rotation) of the cutting tool is smaller than a reference angle of rotation not exceeding a fracture angle. Thus, the cumulative angle of rotation is prevented from exceeding the reference angle of rotation during drive beyond breaking torque while lowering in efficiency in cutting is suppressed, so that fracture of the cutting tool is prevented. The cumulative angle of rotation is defined as a value of the sum of an angle of rotation in forward rotation drive represented by a positive value and an angle of rotation in reverse rotation drive represented by a negative value.

First Embodiment

[Drive of Dental Treatment Apparatus]

Figure 2A:
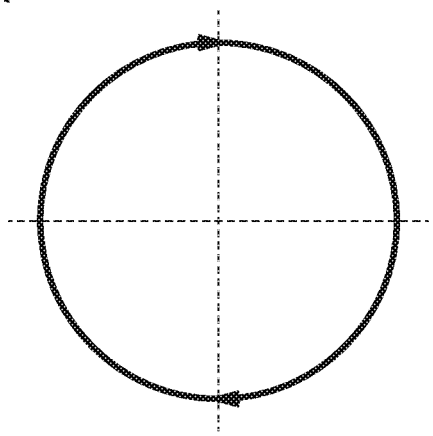
FIGS. 2A to 2C are each a diagram for illustrating a drive pattern used in the root canal treatment instrument according to the present first embodiment.
Figure 2B:
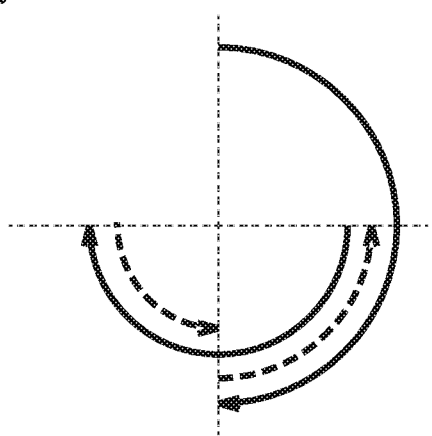
Figure 2C:
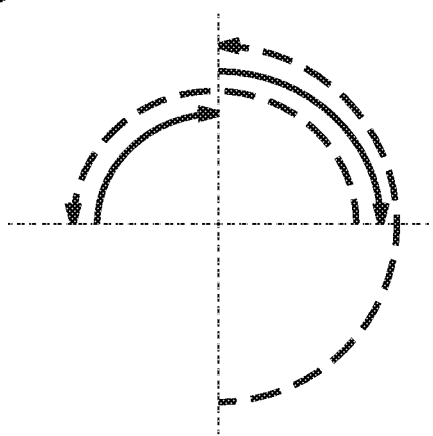

Drive of a root canal treatment instrument representing a dental treatment apparatus according to the present first embodiment will now be described. FIG. 1 is a flowchart for illustrating drive of a root canal treatment instrument 100 according to the present first embodiment. FIGS. 2A to 2C are each a diagram for illustrating a drive pattern used in root canal treatment instrument 100 according to the present first embodiment. Root canal treatment instrument 100 according to the present first embodiment will be described below as including features of root canal treatment instrument 100 shown in FIGS. 5 to 7 which will be described later.

Initially, when drive of root canal treatment instrument 100 is started, a control unit 11 has forward rotation drive carried out in a drive pattern in which a cutting tool 5 is rotated in a forward direction by 180 degrees (step S11). After control unit 11 has cutting tool 5 driven in the forward direction by 180 degrees, a load detector determines whether or not a load applied to cutting tool 5 is greater than a reference value (step S12). Control unit 11 has cutting tool 5 rotated in the forward direction by 180 degrees even though the load applied to cutting tool 5 exceeds the reference value. Cutting tool 5 can thus reliably cut a wall of the root canal (an object to be cut) during rotation in the forward direction by 180 degrees. When the load applied to cutting tool 5 is equal to or smaller than the reference value (NO in step S12), control unit 11 repeats forward rotation drive in the drive pattern (a drive pattern a shown in FIG. 1) in which cutting tool 5 is rotated in the forward direction by 180 degrees unless it accepts a stop operation in step S19. Control unit 11 controls drive in drive pattern a in which cutting tool 5 is continuously rotated in the forward direction as shown in FIG. 2A. FIGS. 2A to 2C each show rotation in the forward direction with a solid arrow and rotation in a reverse direction with a dashed arrow.

When the load applied to cutting tool 5 is greater than the reference value (YES in step S12), control unit 11 determines whether or not a cumulative angle of rotation is equal to or greater than 360 degrees (reference angle of rotation) in drive in which forward rotation drive and reverse rotation drive are repeated (steps S11 to S14) (step S13). When the cumulative angle of rotation is smaller than 360 degrees (NO in step S13), control unit 11 has reverse rotation drive carried out in which cutting tool 5 is rotated in the reverse direction by 90 degrees (step S14). When the load applied to cutting tool 5 is greater than the reference value, control unit 11 repeats drive in a drive pattern (a drive pattern b shown in FIG. 1) in which cutting tool 5 is rotated in the forward direction by 180 degrees and in the reverse direction by 90 degrees unless the control unit accepts a stop operation in step S19. Control unit 11 controls drive in drive pattern b in which cutting tool 5 is rotated in the forward direction by 180 degrees and in the reverse direction by 90 degrees as shown in FIG. 2B.

The cumulative angle of rotation increases by the forward direction (180 degrees)+the reverse direction (−90 degrees) =90 degrees each time drive pattern b is carried out. Therefore, the cumulative angle of rotation is equal to or greater than 360 degrees at the time point when fourth drive pattern b is carried out. When the cumulative angle of rotation is equal to or greater than 360 degrees (YES in step S13), control unit 11 has reverse rotation drive carried out in which cutting tool 5 is rotated in the reverse direction by 180 degrees (step S15). Control unit 11 has cutting tool 5 driven in drive pattern b (step S11 to step S14), and when the cumulative amount of rotation is equal to or greater than the reference amount of rotation, it changes the drive pattern to a drive pattern c (step S15 to step S18). When change to drive pattern c is made, control unit 11 performs processing for rewriting a parameter such as an angle of rotation set in drive pattern b into a parameter such as an angle of rotation set in drive pattern c. In addition, at this timing of change, control is carried out for notifying an operator who uses root canal treatment instrument 100 of change in drive pattern. For example, a buzzer sound may be output from a notification unit 17 or representation to that effect may be given on a display 16.

Then, control unit 11 determines whether or not the cumulative angle of rotation is equal to or smaller than (−360 degrees) in drive in which forward rotation drive and reverse rotation drive are repeated (steps S15 to S18) (step S16). When the cumulative angle of rotation is greater than (−360 degrees) (NO in step S16), control unit 11 has forward rotation drive carried out in a drive pattern in which cutting tool 5 is rotated in the forward direction by 90 degrees (step S17). After control unit 11 has cutting tool 5 driven in the forward direction by 90 degrees, the load detector determines whether or not the load applied to cutting tool 5 is greater than the reference value (step S18). When the load applied to cutting tool 5 is greater than the reference value (YES in step S18), control unit 11 has the process return to step S15. When the load applied to cutting tool 5 is greater than the reference value, control unit 11 repeats drive in the drive pattern in which cutting tool 5 is rotated in the reverse direction by 180 degrees and in the forward direction by 90 degrees (drive pattern c shown in FIG. 1). Control unit 11 controls drive in drive pattern c in which cutting tool 5 is rotated in the reverse direction by 180 degrees and in the forward direction by 90 degrees as shown in FIG. 2C.

When the cumulative angle of rotation is equal to or smaller than (−360 degrees) (YES in step S16), control unit 11 has the process return to step S11 unless it accepts a stop operation in step S19. Control unit 11 has cutting tool 5 driven in drive pattern c (step S15 to step S18), and when the cumulative amount of rotation is equal to or smaller than the reference amount of rotation, it has the drive pattern return to drive pattern b (step S11 to step S14). When the drive pattern is changed back to drive pattern b, control unit 11 performs processing for rewriting a parameter such as an angle of rotation set in drive pattern c into a parameter such as an angle of rotation set in drive pattern b. The cumulative angle of rotation increases by the forward direction (90 degrees)+the reverse direction (−180 degrees)=(−90 degrees) each time drive pattern c is performed. Therefore, the cumulative angle of rotation is equal to or smaller than (−360 degrees) (an absolute value of the cumulative angle of rotation being equal to or greater than the reference angle of rotation) at the time point when fourth drive pattern c is carried out. When the load applied to cutting tool 5 is greater than the reference value, control unit 11 controls drive by switching between drive pattern b and drive pattern c each time the absolute value of the cumulative angle of rotation exceeds 360 degrees.

Therefore, in root canal treatment instrument 100, even though a load greater than the reference value is applied to cutting tool 5, drive is continued within a range not exceeding a fracture angle and hence fracture of the cutting tool can be prevented while lowering in efficiency in cutting is suppressed as compared with control in which reverse rotation drive is carried out each time a load greater than the reference value is applied to cutting tool 5.

When the load applied to cutting tool 5 is not greater than the reference value (NO in step S18), control unit 11 determines whether or not it has accepted a stop operation (step S19). When the control unit has accepted the stop operation (YES in step S19), control unit 11 quits drive for rotating cutting tool 5. When the control unit has not accepted the stop operation (NO in step S19), control unit 11 has the process return to step S11.

Relation between a type and a fracture angle of a cutting tool will be described. FIG. 3 is a diagram for illustrating relation of a manufacturer and a diameter with a fracture angle of a cutting tool. FIG. 3 shows a fracture angle of each of #15 (a diameter of 0.15 mm) to #40 (a diameter of 0.40 mm) of a company A to a company F. A material or a shape of a cutting tool is different for each company, and even cutting tools identical in size are different in fracture angle. For example, there is a great difference between thin cutting tools of #15 of a company B and a company C, with 640 degrees in the cutting tool of company B and 1210 degrees in the cutting tool of company C.

In FIG. 3, a fracture angle of a cutting tool of #30 of company A and a fracture angle of a cutting tool of #20 of a company E are 510 degrees. When a tip end of the cutting tool is restrained and forced to rotate by 510 degrees, the cutting tool may be twisted to break, When the cutting tool is continuously driven in drive patterns a and b in which the cumulative angle of rotation has a positive value as shown in FIG. 2A or 2B, the cumulative angle of rotation exceeds 510 degrees with the tip end of the cutting tool being bit and torsional fracture of the cutting tool occurs.

Relation between a type and breaking torque of a cutting tool will now be described. FIG. 4 is a diagram for illustrating relation of a manufacturer and a diameter with breaking torque of a cutting tool. FIG. 4 shows breaking torque of each of #15 (a diameter of 0.15 mm) to #40 (a diameter of 0.40 mm) of a company A to a company F. A material or a shape of a cutting tool is different for each company, and even cutting tools identical in size are different in breaking torque. For example, in thin cutting tools of #15, company A achieves breaking torque of 11 g·cm whereas company E achieves breaking torque of 21 g·cm, which is approximately twice as large as the former.

In FIG. 4, cutting tools #30 of company A and company E have breaking torque of 54 g·cm. When the tip end of the cutting tool is restrained and a load of 54 g·cm is forcibly applied, the cutting tool may break. Therefore, the reference value of 50 g·cm is set in consideration of a margin.

Drive for reversing rotation while a load applied to a cutting tool is higher than a certain reference value has been known as drive for preventing torsional fracture of the cutting tool. In root canal treatment instrument 100 according to the present first embodiment, even though a load applied to cutting tool 5 is greater than the reference value, cutting tool 5 can be driven so long as the cumulative angle of rotation is within a prescribed range. Control in the present first embodiment is such that the cumulative angle of rotation is within a prescribed range by switching between drive pattern b and drive pattern c including reverse rotation drive when the load applied to cutting tool 5 is greater than the reference value. The prescribed range refers to a range in which the cumulative angle of rotation does not exceed at least the fracture angle.

[Configuration of Dental Treatment Apparatus]

A configuration of a dental treatment apparatus according to the present first embodiment will now be described. A root canal treatment instrument includes a root canal enlargement and root canal length measurement system incorporating a handpiece for dental root canal treatment according to the present first embodiment. The dental treatment apparatus according to the present invention, however, is not limited to the root canal treatment instrument but is applicable to a similarly configured dental treatment apparatus. Though a root canal treatment instrument including a root canal length measurement system will be described, a root canal treatment instrument only for enlargement of a root canal may be applicable.

Figure 5:
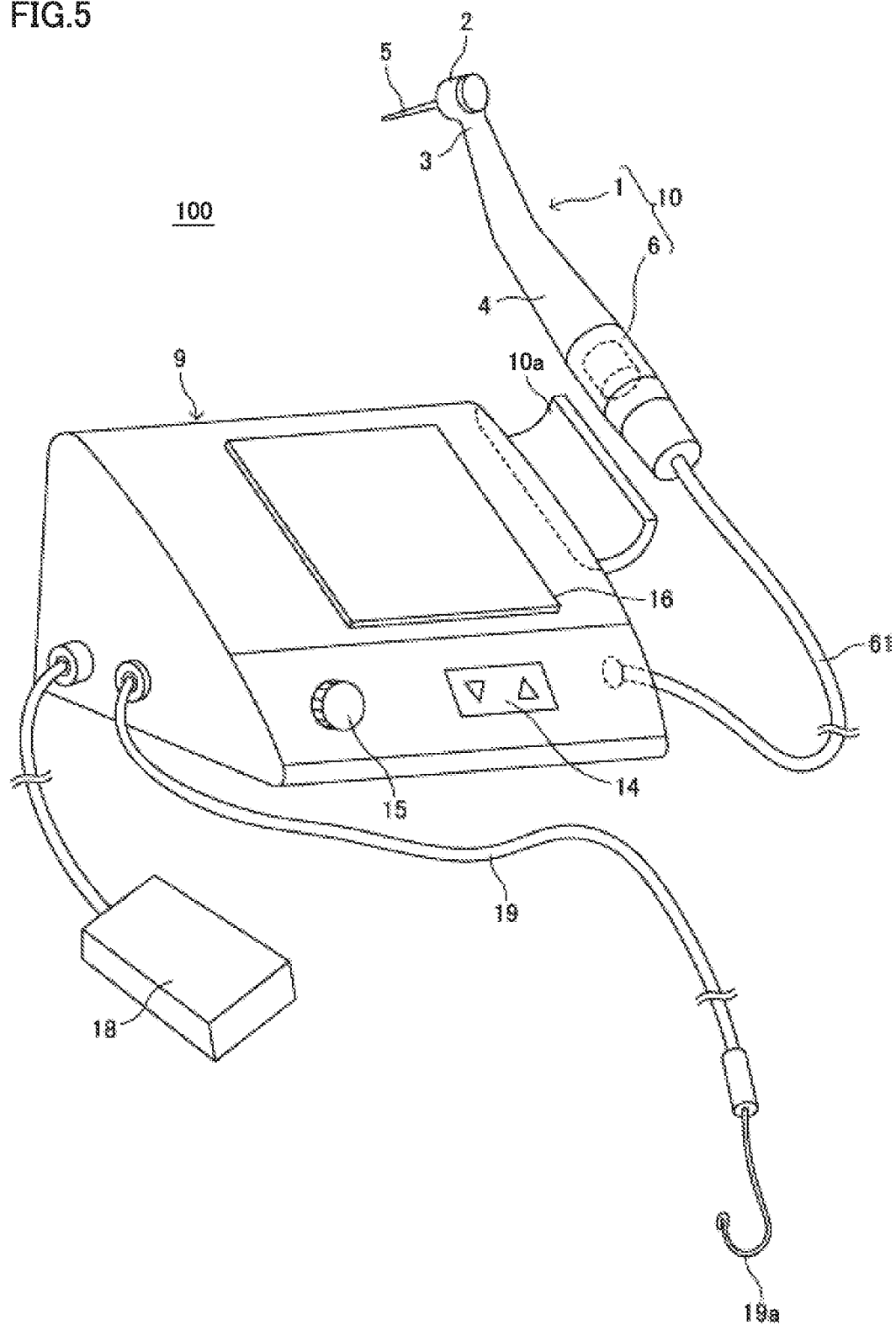
FIG. 5 is a schematic diagram showing a feature of appearance of the root canal treatment instrument according to the present first embodiment.
Figure 6:
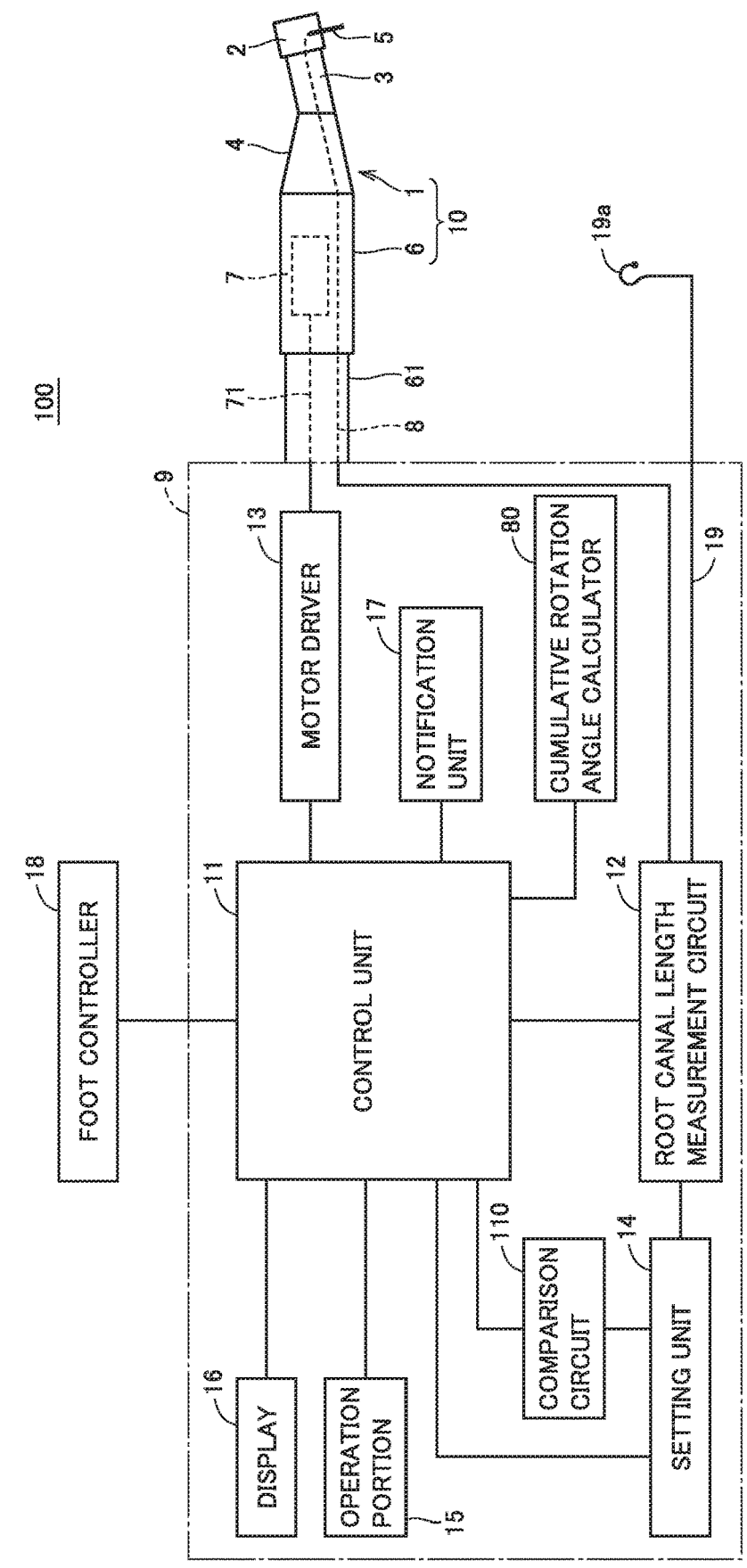
FIG. 6 is a block diagram showing a functional configuration of the root canal treatment instrument according to the present first embodiment.

FIG. 5 is a schematic diagram showing a feature of appearance of the root canal treatment instrument according to the present first embodiment. FIG. 6 is a block diagram showing a functional configuration of the root canal treatment instrument according to the present first embodiment. Root canal treatment instrument 100 shown in FIG. 5 includes a handpiece 1 for dental root canal treatment, a motor unit 6, and a control box 9.

Handpiece 1 for dental root canal treatment includes a head 2, a neck 3 small in diameter and continuous to head 2, and a grip 4 continuous to neck 3 and gripped with fingers. Motor unit 6 for rotatably driving cutting tool 5 (a file or a reamer) held by head 2 is removably connected to a base portion of grip 4. A dental instrument 10 is constructed with motor unit 6 being coupled to handpiece 1.

As shown in FIG. 6, motor unit 6 contains a micromotor 7 and is coupled to control box 9 through a power supply lead 71 supplying power to micromotor 7 and a hose 61 containing a signal lead 8 transmitting a signal to a root canal length measurement circuit 12 which will be described later. Signal lead 8 is a part of a conductor electrically connected to cutting tool 5 with motor unit 6 and handpiece 1 being interposed and transmitting an electric signal. Cutting tool 5 serves as one electrode of root canal length measurement circuit 12.

Control box 9 includes a control unit 11, a comparison circuit 110, root canal length measurement circuit 12, a motor driver 13, a setting unit 14, an operation portion 15, a display 16, a notification unit 17, and a cumulative rotation angle calculator 80. As shown in FIG. 5, a holder 10a for holding instrument 10 while the instrument is not used is attached to control box 9 in a side portion of a main body. In control box 9, a foot controller 18 is coupled to control unit 11 and a lead 19 is coupled to root canal length measurement circuit 12. Though lead 19 is pulled out of control box 9, it may be pulled out as being branched from a point intermediate in hose 61. A mouth cavity electrode 19a placed over a lip of a patient is attached to a tip end of lead 19 as being electrically connected. Mouth cavity electrode 19a serves as the other electrode of root canal length measurement circuit 12.

Control unit 11 is responsible for overall control of the root canal enlargement and root canal length measurement system and a main portion thereof is implemented by a microcomputer. Comparison circuit 110, root canal length measurement circuit 12, motor driver 13, setting unit 14, operation portion 15, display 16, notification unit 17, and foot controller 18 are connected to control unit 11. Control unit 11 controls a direction of rotation of cutting tool 5 cutting a treatment portion. Specifically, control unit 11 controls drive to any of forward rotation drive for rotating cutting tool 5 in the forward direction (clockwise (also called right rotation)) and reverse rotation drive for rotating cutting tool 5 in the reverse direction (counterclockwise (also called left rotation)) in accordance with a drive sequence. A direction of rotation of the cutting tool (clockwise or counterclockwise) is discussed with the direction from the side of cutting tool 5 attached to head 2 toward the tip end of cutting tool 5 being defined as the reference. Control unit 11 can control drive for rotating cutting tool 5 with parameters including an angle of rotation, a rotation speed, or an angular rotation speed (the number of rotations) in the clockwise direction, an angle of rotation, a rotation speed, or an angular rotation speed (the number of rotations) in the counterclockwise direction, and the number of times of repetition being changed.

An angle of rotation refers to an amount of rotation representing an extent of rotation of cutting tool 5 clockwise or counterclockwise, and it may be defined by a time period for rotation (also called a time period for drive) when the number of times of rotation or an angular rotation speed (the number of rotations) is constant. An angle of rotation may be defined by an amount associated with drive of cutting tool 5 such as an amount of a drive current or an amount of torque. Though description will be given herein with reference to an angle of rotation, it may be replaced with the number of times of rotation. For example, setting the number of times of rotation of cutting tool 5 to ½ rotation is the same in meaning as rotation of cutting tool 5 by 180 degrees. Drive of cutting tool 5 for 0.25 second with a rotation speed of cutting tool 5 being constant at 120 rotations per minute is the same in meaning as rotation of cutting tool 5 by 180 degrees. Strictly speaking, for example, correspondence between a time period for rotation in terms of control and an actual angle of rotation may have to be corrected depending on a load applied to the cutting tool or the motor, however, an amount of correction is extremely small and hence it is ignorable in carrying out the present invention.

Comparison circuit 110 is necessary for detecting a load applied to cutting tool 5 and can selectively be provided when detection of the load is necessary. Comparison circuit 110 can compare a load at any time point during rotation of cutting tool 5 clockwise or counterclockwise by motor driver 13. Specifically, comparison circuit 110 can compare a load applied to cutting tool 5 with a reference load after cutting tool 5 is rotated by a prescribed angle of rotation (for example, 180 degrees) clockwise or counterclockwise. Comparison circuit 110 may further compare at least one of a maximum value, an average value, and a plurality of detected load values of loads detected during rotation by a prescribed angle of rotation (for example, 180 degrees) as a load applied to cutting tool 5 with the reference load.

Root canal length measurement circuit 12 is necessary for detecting a position of a tip end of cutting tool 5 in a root canal, and can selectively be provided when detection of the position is necessary. Root canal length measurement circuit 12 forms a closed circuit with cutting tool 5 inserted in a root canal of a tooth being defined as one electrode and mouth cavity electrode 19a placed over a lip of a patient being defined as the other electrode. Root canal length measurement circuit 12 can measure a distance from a position of a root apex of a tooth to the tip end of cutting tool 5 by measuring an impedance between cutting tool 5 and mouth cavity electrode 19a by applying a measurement voltage across cutting tool 5 and mouth cavity electrode 19a. When root canal length measurement circuit 12 detects the tip end of cutting tool 5 reaching the position of the root apex, an amount of insertion of the cutting tool, that is, the distance from a mouth of the root canal to the tip end of the cutting tool, can be defined as a root canal length. An electric root canal length measurement method for measuring a root canal length by measuring an impedance between cutting tool 5 and mouth cavity electrode 19a has been known, and all known electric root canal length measurement methods are applicable to root canal treatment instrument 100 according to the first embodiment.

Motor driver 13 is connected to micromotor 7 through power supply lead 71 and controls power supplied to micromotor 7 based on a control signal from control unit 11. Motor driver 13 can control a direction of rotation, the number of rotations, and an angle of rotation of micromotor 7, that is, a direction of rotation, the number of rotations, and an angle of rotation of cutting tool 5, by controlling power supplied to micromotor 7. The drive unit is constituted mainly of micromotor 7 and motor driver 13.

Setting unit 14 sets the reference for controlling a direction of rotation, the number of rotations, and an angle of rotation of cutting tool 5. Setting unit 14 sets a switch criterion to be compared by comparison circuit 110 with a load applied to cutting tool 5 (a criterion for switching a parameter of a drive sequence or a drive pattern), a reference load, and timing. Setting unit 14 can set in advance with root canal length measurement circuit 12, a position of a root apex as the reference position and a position at a prescribed distance from the position of the root apex as a switch position (a criterion for switching a parameter of a drive sequence or a drive pattern). Root canal treatment instrument 100 can change a parameter including a direction of rotation, the number of rotations, and an angle of rotation of cutting tool 5 when the tip end of cutting tool 5 reaches the reference position, by setting the reference position in advance with setting unit 14.

Operation portion 15 sets a parameter including the number of rotations and an angle of rotation of cutting tool 5 and can also set selection as to whether or not to measure a root canal length. Operation portion 15 can allow manual switching of a drive sequence or a drive pattern, switching between forward rotation drive and reverse rotation drive, or switching between forward rotation drive and twist drive.

As will be described later, display 16 shows a position of the tip end of cutting tool 5 in a root canal or a direction of rotation, the number of rotations, and an angle of rotation of cutting tool 5. Display 16 can also show information given from notification unit 17 to an operator (user).

Notification unit 17 gives a notification about a state of drive of cutting tool 5 currently caused by control unit 11 through light, sound, or vibration. Specifically, notification unit 17 is provided with a light emitting diode (LED), a speaker, or an oscillator as necessary for giving a notification about a state of drive of cutting tool 5, and changes a color of the LED emitting light or changes sound output from the speaker between forward drive and reverse drive. When display 16 can show a state of drive of cutting tool 5 to an operator, notification unit 17 does not have to separately include an LED, a speaker, or an oscillator.

Foot controller 18 is an operation portion with which drive and control of cutting tool 5 by micromotor 7 is indicated through a stepping operation. Drive and control of cutting tool 5 by micromotor 7 is not limited to drive and control with foot controller 18. An operation switch (not shown) may be provided in grip 4 of handpiece 1 and cutting tool 5 may be driven and controlled by using both of the operation switch and foot controller 18. For example, when root canal length measurement circuit 12 detects insertion of cutting tool 5 into a root canal while an operation to step on foot controller 18 is performed, rotation of cutting tool 5 may be started.

Cumulative rotation angle calculator 80 refers to a calculator configured to calculate a cumulative angle of rotation for each rotation direction in a drive pattern. Cumulative rotation angle calculator 80 calculates as a cumulative angle of rotation, a value of the sum of an angle of rotation in forward rotation drive represented by a positive value and an angle of rotation in reverse rotation drive represented by a negative value. Cumulative rotation angle calculator 80 resets a calculated value each time a drive pattern is switched. For example, when switching to drive pattern c is made after cumulative rotation angle calculator 80 calculates the cumulative angle of rotation in drive pattern b as 360 degrees, it resets the calculated cumulative angle of rotation to 0 degree. When root canal length measurement circuit 12 which will be described later detects removal of cutting tool 5 from the root canal or raise of a position of the tip end of cutting tool 5 in the root canal to a predetermined position, cumulative rotation angle calculator 80 may reset the cumulative angle of rotation to 0 degree.

Though control box 9 of root canal treatment instrument 100 is used as being placed on a tray table or a side table set at a side portion of a dental treatment couch, the present invention is not limited as such and control box 9 may be incorporated in the tray table or the side table.

Figure 7:
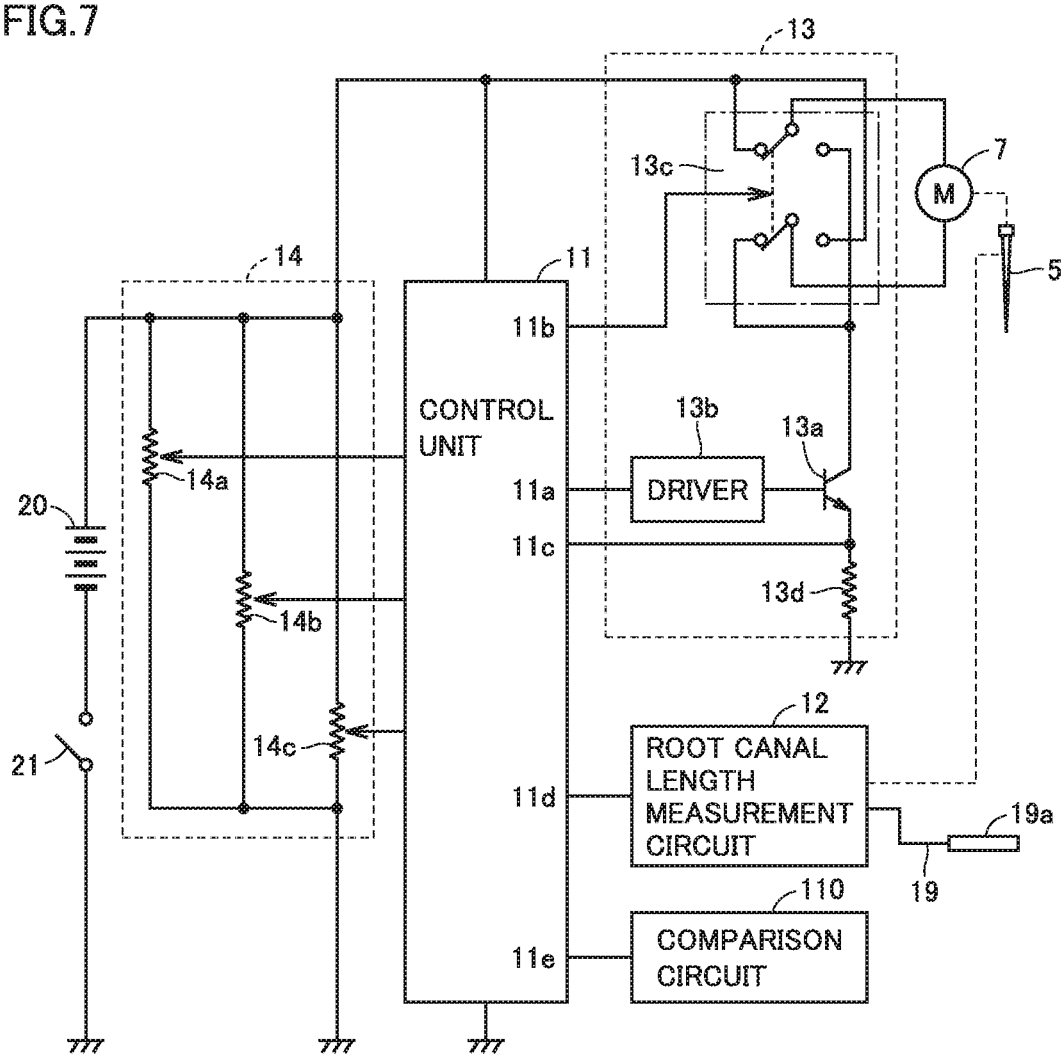
FIG. 7 is a circuit diagram showing a circuit configuration of the root canal treatment instrument according to the present first embodiment.

A circuit configuration of root canal treatment instrument 100 driving and controlling cutting tool 5 will now be described in further detail. FIG. 7 is a circuit diagram showing a circuit configuration of root canal treatment instrument 100 according to the present first embodiment. In connection with root canal treatment instrument 100 shown in FIG. 7, micromotor 7 involved with drive and control of cutting tool 5, control unit 11, comparison circuit 110, root canal length measurement circuit 12, motor driver 13, and setting unit 14 are shown.

Motor driver 13 includes a transistor switch 13*a*, a transistor driver circuit 13*b*, a rotation direction switch 13*c*, and a load detection resistor 13*d*. Though rotation direction switch 13*c* is described as a relay element, a motor drive circuit may be configured with a semiconductor switching element such as an FET. Setting unit 14 includes a reference load setting variable resistor 14*a*, a duty setting variable resistor 14*b*, and a reference position setting variable resistor 14*c*. Though setting unit 14 includes also a feature setting an angle of rotation (or a time period for rotation) indicating timing of comparison between a detected load and a reference load by comparison circuit 110, FIG. 7 does not show such a feature. Root canal treatment instrument 100 shown in FIG. 7 is connected to a main power supply 20 and a main switch 21. Cutting tool 5 is held by micromotor 7 with an appropriate gear mechanism being interposed, although it is not shown.

Transistor driver circuit 13*b* is activated by a control signal output from a port 11*a* of control unit 11, controls on and off of transistor switch 13*a*, and drives micromotor 7. Micromotor 7 rotates clockwise or counterclockwise in accordance with a state of rotation direction switch 13*c*. When a control signal output from port 11*a* of control unit 11 has a waveform of pulses, for example, as being repeated in a certain period, a width of the waveform of the pulses, that is, a duty ratio, is adjusted by duty setting variable resistor 14*b* of setting unit 14. Micromotor 7 drives cutting tool 5 at the number of rotations corresponding to the duty ratio.

Rotation direction switch 13*c* switches between drive of cutting tool 5 in the clockwise direction and drive in the counterclockwise direction in accordance with a control signal output from a port 11*b* of control unit 11. Control unit 11 detects a load applied to cutting tool 5 based on an amount of a current (or a voltage value) from load detection resistor 13*d* input to a port 11*c*. Therefore, load detection resistor 13*d* functions as a load detector detecting a load applied to cutting tool 5. The load detector is not limited to a feature detecting a load applied to cutting tool 5 based on an amount of a current (or a voltage value) from load detection resistor 13*d*, but may be implemented by another feature such as a feature detecting a load applied to cutting tool 5 by providing a torque sensor in a unit driving cutting tool 5. A detected load is converted, for example, into a value for torque applied to cutting tool 5 by control unit 11 and shown on display 16. Comparison circuit 110 compares the torque value resulting from conversion by control unit 11 with a torque value set by reference load setting variable resistor 14*a*. Comparison circuit 110 may naturally directly compare an amount of a current (or a voltage value) from load detection resistor 13*d* with an amount of a current (or a voltage value) from variable resistor 14*a* without conversion into a torque value.

Control unit 11 receives input of a root canal length measured with root canal length measurement circuit 12 at a port 11*d*. Therefore, root canal length measurement circuit 12 functions as a position detector detecting a position of the tip end of cutting tool 5 in a root canal. Control unit 11 outputs a load applied to cutting tool 5 and detected by the load detector from a port 11*e* to comparison circuit 110, and receives input of a result of comparison resulting from comparison with the reference load by comparison circuit 110 at port 11*e*. Therefore, comparison circuit 110 functions as a load comparator comparing a load detected by the load detector with the reference load. Control unit 11 may be configured such that the features described as analog circuits are integrated as software in one microcomputer.

Figure 8:
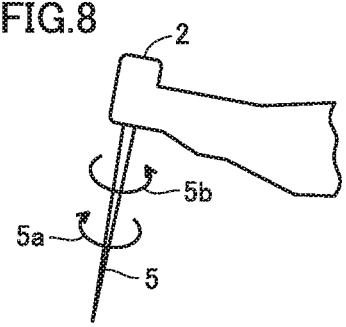
FIG. 8 is a schematic diagram showing a direction of rotation of a cutting tool.

FIG. 8 is a schematic diagram showing a direction of rotation of cutting tool 5. In connection with the direction of rotation of cutting tool 5 shown in FIG. 8, drive in a clockwise direction 5*a* in which cutting tool 5 is rotated to the right when viewed from the side of cutting tool 5 attached to head 2 toward the tip end of cutting tool 5 and drive in a counterclockwise direction 5b in which the cutting tool is rotated to the left are shown. Such drive that drive for rotating cutting tool 5 clockwise 5a by a predetermined angle of rotation and drive for rotating cutting tool 5 counterclockwise 5b by a predetermined angle of rotation are alternately performed is defined as twist drive.

Figure 9:
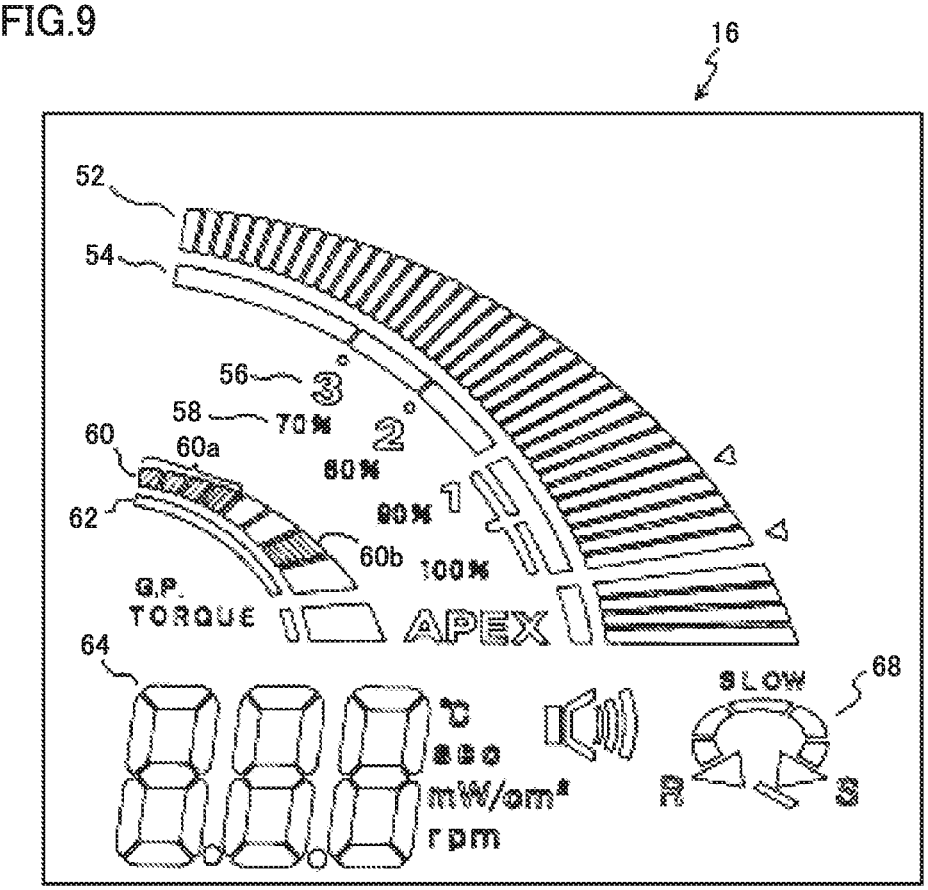
FIG. 9 is a diagram showing an example of representation on a liquid crystal display panel provided in a display shown in FIG. 5.

Representation on a liquid crystal display panel provided in display 16 shown in FIG. 5 will now be described. FIG. 9 is a diagram showing an example of representation on a liquid crystal display panel provided in display 16 shown in FIG. 5.

Display 16 shown in FIG. 9 is implemented by a liquid crystal display panel, and includes a dot display portion 52 including a number of elements for showing a measured root canal length in detail, a zone display portion 54 for showing stepwise a root canal length in a plurality of divided zones, a boundary display portion 56 showing a boundary between zones, and a proximity display portion 58 showing proximity to a root apex as a ratio.

Dot display portion 52 shows elements sequentially downward from the top as the tip end of cutting tool 5 is closer to the root apex. A position indicated by a mark "APEX" indicates a position of the root apex, and the element reaching the mark indicates that the tip end of cutting tool 5 has substantially reached the position of the root apex.

Display 16 includes a dot display portion 60 including a number of elements for showing a load detected by the load detector (load detection resistor 13d, see FIG. 7) and a zone display portion 62 for showing stepwise a load in a plurality of divided zones. Dot display portion 60 shows elements sequentially downward from the top as a load detected by the load detector is higher.

For example, dot display portion 60 shows with an element 60a shown with hatching, a load on cutting tool 5 applied when a tooth is cut. Dot display portion 60 may have a peak holding function in order to prevent representation from frequently changing and it may show for a certain period of time, a maximum value for the load detected within a prescribed period of time.

Dot display portion 60 may show an element 60b corresponding to the reference load set by setting unit 14 (see FIG. 7). By showing element 60b on dot display portion 60, how much margin is left for a load detected by the load detector with respect to the reference load can be visualized.

Display 16 further includes a numeric value display portion 64 showing the number of rotations of cutting tool 5 or a load applied to cutting tool 5 with a numeric value and a rotary display portion 68 showing a direction of rotation of cutting tool 5 (clockwise or counterclockwise) and magnitude of the number of rotations of cutting tool 5.

[Specific Example of Drive of Dental Treatment Apparatus]

Figure 10:
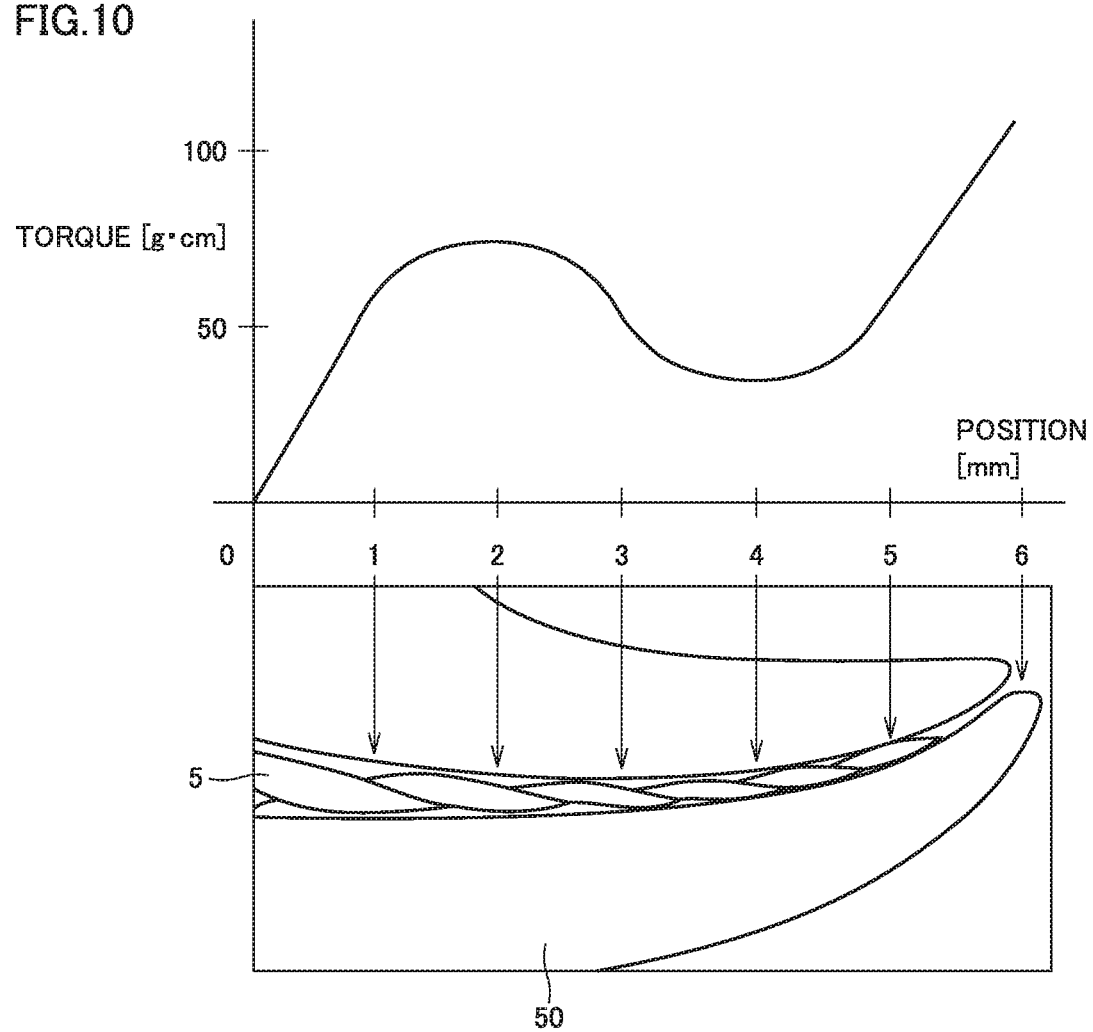
FIG. 10 is a diagram for illustrating relation between torque applied to the cutting tool in the root canal treatment instrument and a position in a tooth.
Figure 11:
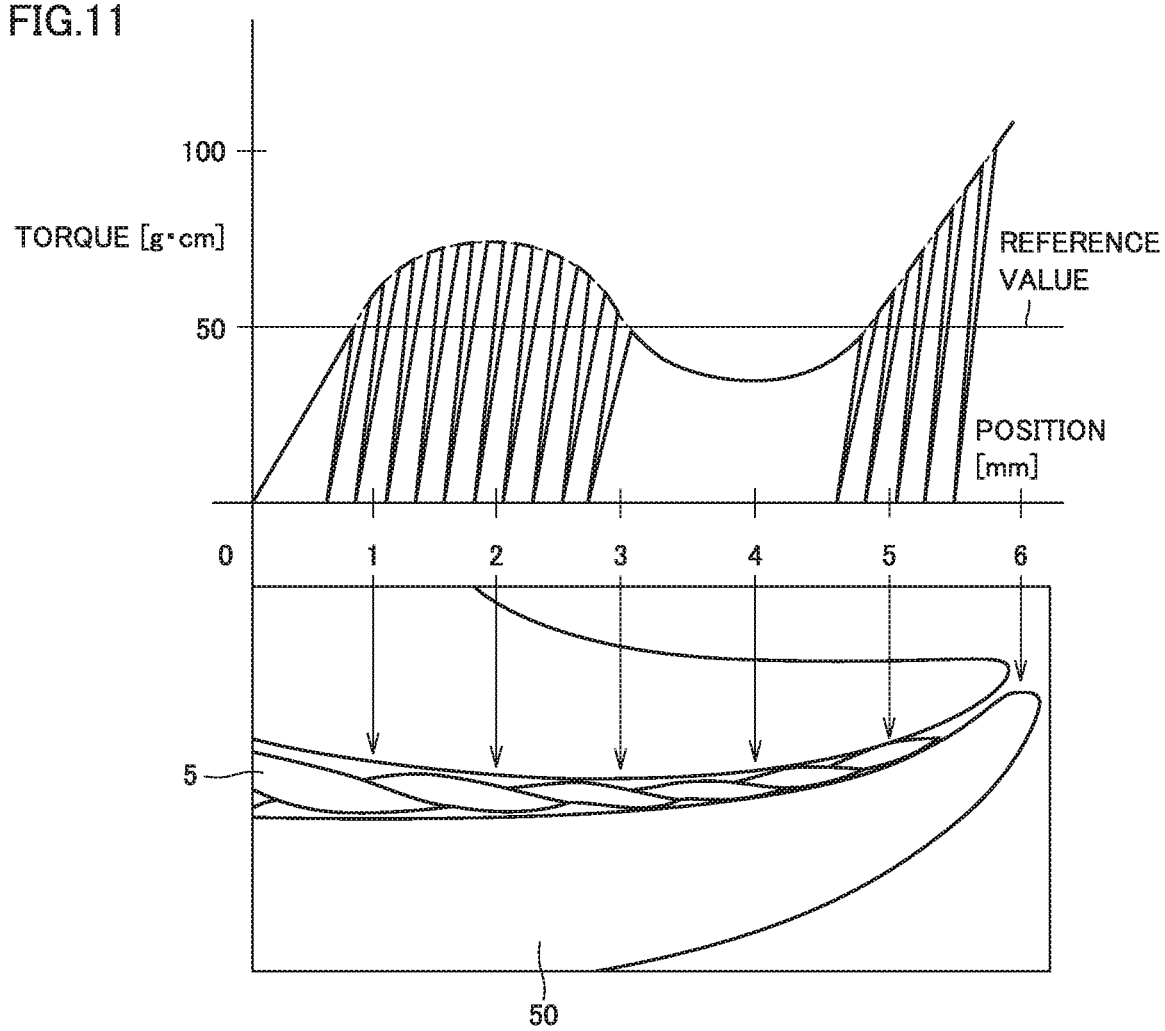
FIG. 11 is a diagram for illustrating relation between torque applied to the cutting tool in the root canal treatment instrument according to the present first embodiment and a position in a tooth.
Figure 12:
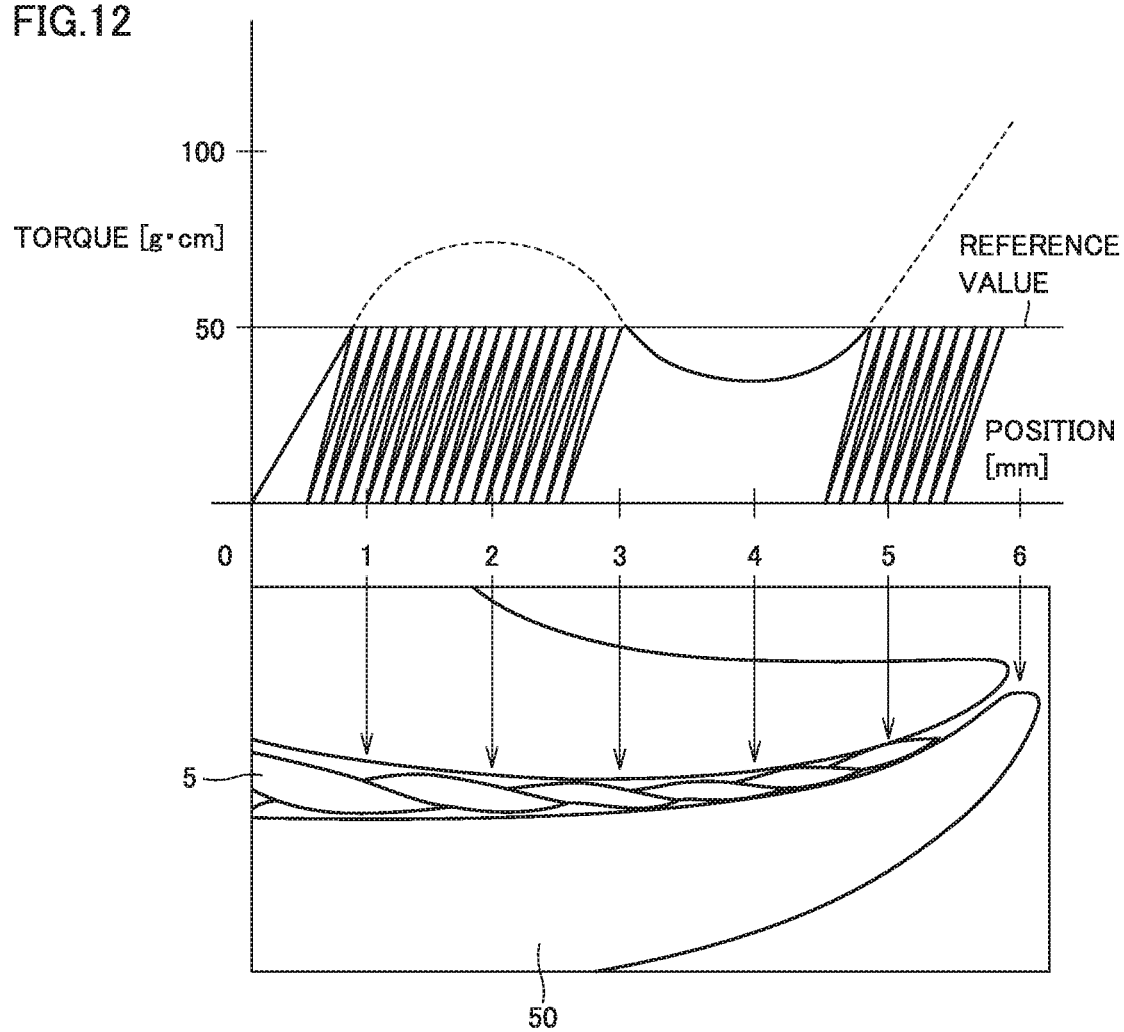
FIG. 12 is a diagram for illustrating relation between torque applied to the cutting tool in a root canal treatment instrument to be compared and a position in a tooth.

A specific example of drive of root canal treatment instrument 100 representing the dental treatment apparatus according to the present first embodiment will now be described. FIG. 10 is a diagram for illustrating relation between torque applied to cutting tool 5 in root canal treatment instrument 100 and a position in a tooth 50. FIG. 11 is a diagram for illustrating relation between torque applied to cutting tool 5 in root canal treatment instrument 100 according to the present first embodiment and a position in tooth 50. FIG. 12 is a diagram for illustrating relation between torque applied to cutting tool 5 in a root canal treatment instrument to be compared and a position in tooth 50.

Initially, FIG. 10 shows a cross-sectional view of tooth 50 including a root canal extending by 6 mm from a position of the root apex. When cutting tool 5 is inserted from the left side in the figure and the root canal is enlarged until reaching the root apex, torque (load) applied to cutting tool 5 at each position is different depending on a degree of curve of the root canal. Specifically, from 0 mm to 2 mm, torque applied to cutting tool 5 increases and attains to approximately 70 g·cm at 2 mm. Thereafter, from 2 mm to 4 mm, torque applied to cutting tool 5 decreases and attains to approximately 30 g·cm at 4 mm. From 4 mm to 6 mm corresponding to the position of the root apex, torque applied to cutting tool 5 increases.

FIG. 11 shows variation in torque applied to cutting tool 5 when drive shown in FIG. 1 is carried out, with 50 g·cm being set as the reference value in root canal treatment instrument 100 according to the present first embodiment. In FIG. 11, when the reference value of 50 g·cm is exceeded, after drive of cutting tool 5 in the forward direction by 180 degrees, switching to drive of cutting tool 5 in the reverse direction by 90 degrees (step S14 shown in FIG. 1) is made so as to lower torque applied to cutting tool 5. Thereafter, root canal treatment instrument 100 changes drive back to drive in which cutting tool 5 is rotated in the forward direction by 180 degrees (step S11 shown in FIG. 1). At this time, even though torque applied to cutting tool 5 exceeds the reference value of 50 g·cm, forward rotation drive is continued until rotation in the forward direction by 180 degrees is performed. Therefore, torque applied to cutting tool 5 is varied along the curve shown in FIG. 10. Root canal treatment instrument 100 according to the present first embodiment can cut the wall of the root canal as in drive shown in FIG. 10 without torque control while cutting tool 5 is driven in the forward direction by 180 degrees.

FIG. 12 shows variation in torque applied to cutting tool 5 when switching to reverse rotation drive is made at the time point when torque applied to cutting tool 5 exceeds the reference value, with 50 g·cm being set as the reference value in the root canal treatment instrument to be compared. In FIG. 12, torque applied to cutting tool 5 is lowered by driving cutting tool 5 in the reverse direction at the time point when the reference value of 50 g·cm is exceeded. Thereafter, the root canal treatment instrument to be compared changes drive back to forward rotation drive when torque applied to cutting tool 5 is equal to or smaller than the reference value. At this time, when torque applied to cutting tool 5 exceeds the reference value of 50 g·cm, cutting tool 5 is again driven in the reverse direction. Therefore, in a range exceeding the reference value of 50 g·cm, the root canal treatment instrument to be compared is unable to carry out drive along the curve shown in FIG. 10 with torque applied to cutting tool 5. In the range exceeding the reference value of 50 g·cm, the root canal treatment instrument to be compared is unable to drive cutting tool 5 and unable to cut the wall of the root canal as in drive shown in FIG. 10 without torque control.

As is understood based on comparison between variation in torque applied to cutting tool 5 shown in FIG. 11 and variation in torque applied to cutting tool 5 shown in FIG. 12, root canal treatment instrument 100 according to the present first embodiment can achieve suppression of lowering in efficiency in cutting by carrying out drive shown in FIG. 1.

As set forth above, root canal treatment instrument 100 according to the present first embodiment includes a drive unit capable of forward rotation drive in which cutting tool 5 held by head 2 of handpiece 1 is rotated in a cutting direction and reverse rotation drive in which the cutting tool is rotated in a non-cutting direction, control unit 11 configured to control the drive unit configured to drive cutting tool 5, a load detector configured to detect a load applied to cutting tool 5, and cumulative rotation angle calculator 80 configured to calculate a cumulative angle of rotation which represents accumulation for each rotation direction, of angles of rotation (amounts of rotation) of cutting tool 5 driven by the drive unit while drive with the forward rotation drive and the reverse rotation drive being repeated is carried out. Control unit 11 is configured to continue drive of cutting tool 5 in forward rotation drive until reaching 180 degrees (a predetermined first amount of rotation) regardless of a result obtained by the load detector, and when a load applied to cutting tool 5 and detected by the load detector in forward rotation drive of cutting tool 5 up to 180 degrees is equal to or greater than a reference load, to switch drive of cutting tool 5 to reverse rotation drive until reaching 90 degrees (a predetermined second amount of rotation). When the cumulative angle of rotation calculated by cumulative rotation angle calculator 80 is equal to or greater than a reference angle of rotation while drive with forward rotation drive and reverse rotation drive being repeated is carried out, control unit 11 is configured to carry out predetermined control for eliminating twist of the cutting tool. Therefore, in root canal treatment instrument 100 according to the present first embodiment, when the cumulative angle of rotation calculated by cumulative rotation angle calculator 80 is equal to or greater than the reference angle of rotation, control unit 11 is configured to carry out predetermined control for eliminating twist of the cutting tool and hence fracture of cutting tool 5 due to torsional fracture can be prevented while lowering in efficiency in cutting is suppressed.

As set forth above, in the method of driving root canal treatment instrument 100 according to the present first embodiment, drive of cutting tool 5 in forward rotation drive is continued until reaching 180 degrees regardless of a result obtained by the load detector configured to detect a load applied to cutting tool 5, and when the load applied to cutting tool 5 and detected by the load detector in forward rotation drive of cutting tool 5 up to 180 degrees is equal to or greater than the reference load, drive of cutting tool 5 is switched to reverse rotation drive until reaching 90 degrees. When the cumulative amount of rotation which represents accumulation of amounts of rotation of cutting tool 5 when drive with forward rotation drive and reverse rotation drive being repeated is carried out is equal to or greater than the reference amount of rotation, change to a drive pattern is made. In the changed drive pattern, drive of cutting tool 5 in forward rotation drive is continued until reaching 90 degrees regardless of a result obtained by the load detector, and when the load applied to cutting tool 5 and detected by the load detector in forward rotation drive of cutting tool 5 up to 90 degrees is equal to or greater than the reference load, drive of cutting tool 5 is switched to reverse rotation drive until reaching 180 degrees.

Predetermined control may be defined as control for changing to a drive pattern in which drive of cutting tool 5 is continued in forward rotation drive regardless of the result obtained by the load detector until reaching 90 degrees (a predetermined third amount of rotation) and drive of cutting tool 5 is switched to reverse rotation drive until reaching 180 degrees (a predetermined fourth amount of rotation) when the load applied to cutting tool 5 and detected by the load detector in forward rotation drive of cutting tool 5 up to 90 degrees is equal to or greater than the reference load. Root canal treatment instrument 100 can thus change to a drive pattern such that the cumulative angle of rotation is equal to or smaller than the reference angle of rotation, and fracture of cutting tool 5 due to torsional fracture can be prevented. The fourth amount of rotation is defined as an angle of rotation greater than the third amount of rotation. The third amount of rotation in forward rotation drive is not limited to an amount of rotation equal to 90 degrees as the second amount of rotation in reverse rotation drive, and it may be set to a different amount of rotation and includes also 0 (zero) degree. The fourth amount of rotation in reverse rotation drive is not limited to an amount of rotation equal to 180 degrees as the first amount of rotation in forward rotation drive, and it may be set to a different amount of rotation and includes also 0 (zero) degree.

Control unit 11 has cutting tool 5 driven in the changed drive pattern and changes the drive pattern back to a previous drive pattern when an absolute value of the cumulative angle of rotation calculated by cumulative rotation angle calculator 80 is equal to or greater than the reference angle of rotation. Root canal treatment instrument 100 can thus repeatedly change the drive pattern such that the cumulative angle of rotation is equal to or smaller than the reference angle of rotation, and fracture of cutting tool 5 due to torsional fracture can be prevented.

Predetermined control may be defined as control for carrying out forward rotation drive or reverse rotation drive such that the cumulative angle of rotation calculated by cumulative rotation angle calculator 80 is smaller than the reference angle of rotation even though forward rotation drive or reverse rotation drive is carried out such that the cumulative angle of rotation calculated by cumulative rotation angle calculator 80 is zero or close to zero. Root canal treatment instrument 100 can thus change to the drive pattern such that the cumulative angle of rotation is equal to or smaller than the reference angle of rotation, and fracture of cutting tool 5 due to torsional fracture can be prevented. Though forward rotation drive or reverse rotation drive is described as being carried out such that the cumulative angle of rotation is zero, the cumulative angle of rotation does not necessarily have to be zero, and control for carrying out forward rotation drive or reverse rotation drive toward zero is also included. For example, predetermined control is defined as control for carrying out forward rotation drive or reverse rotation drive such that the cumulative angle of rotation is close to zero. Being close to zero refers to an angle up to approximately 10 degrees in the forward direction or the reverse direction. Even though a difference by approximately 10 degrees is accumulated in the forward direction or the reverse direction in driving cutting tool 5, twist of cutting tool 5 is highly likely to be eliminated by the time of fracture of cutting tool 5. An operator may perform an operation to raise cutting tool 5 by the time of fracture of cutting tool 5 and the cumulative angle of rotation does not have to strictly be zero.

Second Embodiment

Figure 13:
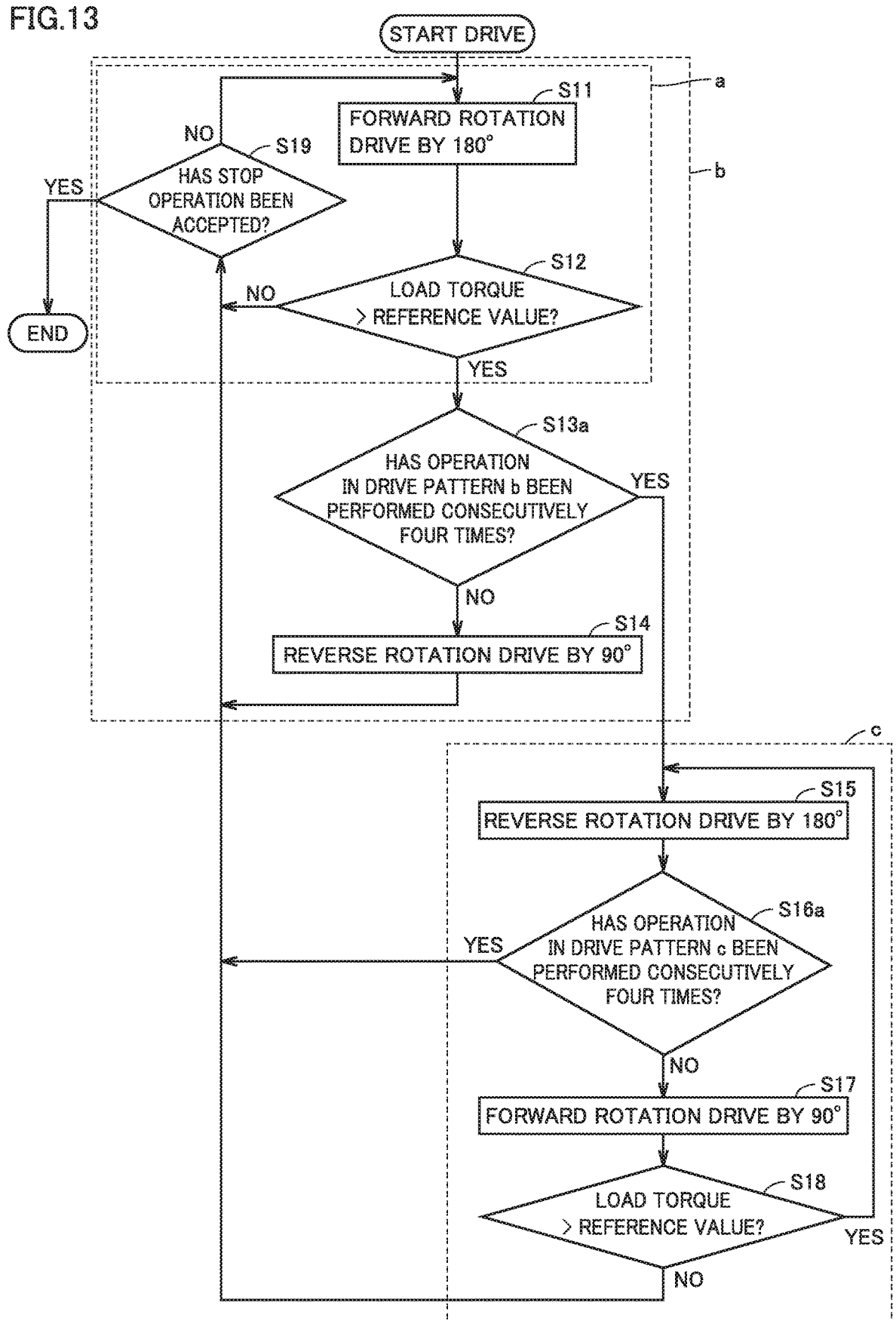
FIG. 13 is a flowchart for illustrating drive of the root canal treatment instrument according to the present second embodiment.

In root canal treatment instrument 100 according to the first embodiment, a cumulative angle of rotation is calculated and a drive pattern is switched based on the cumulative angle of rotation. In an example where an angle of rotation in forward rotation drive and reverse rotation drive included in a drive pattern is constant, control as in control according to the first embodiment can be carried out even though the drive pattern is switched based on the number of times of operation in the drive pattern. In other words, control can also be considered as calculation of a cumulative angle of rotation based on the number of times of operation in a drive pattern and switching between drive patterns. Control for switching between drive patterns based on the number of times of operation in a drive pattern in the root canal treatment instrument according to the present second embodiment will now be described. FIG. 13 is a flowchart for illustrating drive of root canal treatment instrument 100 according to the present second embodiment. Since root canal treatment instrument 100 according to the present second embodiment is also the same in configuration as root canal treatment instrument 100 according to the first embodiment shown in FIGS. 5 to 7, the same reference characters are allotted and detailed description will not be repeated.

Initially, when drive of root canal treatment instrument 100 is started, control unit 11 has forward rotation drive carried out in a drive pattern in which cutting tool 5 is rotated in the forward direction by 180 degrees (step S11). After control unit 11 has cutting tool 5 driven in the forward direction by 180 degrees, the load detector determines whether or not a load applied to cutting tool 5 is greater than a reference value (step S12). When the load applied to cutting tool 5 is equal to or smaller than the reference value (NO in step S12), control unit 11 repeats forward rotation drive in the drive pattern (drive pattern a shown in FIG. 13) in which cutting tool 5 is rotated in the forward direction by 180 degrees unless it accepts a stop operation in step S19. Control unit 11 controls drive in drive pattern a in which cutting tool 5 is continuously rotated in the forward direction as shown in FIG. 2A.

When the load applied to cutting tool 5 is greater than the reference value (YES in step S12), control unit 11 determines whether or not an operation in drive pattern b has been performed consecutively four times (step S13a). When the operation in drive pattern b has not been performed consecutively four times (NO in step S13a), control unit 11 has reverse rotation drive carried out in which cutting tool 5 is rotated in the reverse direction by 90 degrees (step S14). When the load applied to cutting tool 5 is greater than the reference value, control unit 11 repeats drive in a drive pattern (drive pattern b shown in FIG. 13) in which cutting tool 5 is rotated in the forward direction by 180 degrees and in the reverse direction by 90 degrees unless the control unit accepts a stop operation in step S19. Control unit 11 controls drive in drive pattern b in which cutting tool 5 is rotated in the forward direction by 180 degrees and in the reverse direction by 90 degrees as shown in FIG. 2B.

The operation in drive pattern b performed consecutively four times means drive in the forward direction (180 degrees)×four times and drive in the reverse direction (−90 degrees)×four times. Therefore, the cumulative angle of rotation is calculated as forward direction (180 degrees)× four times and reverse direction (−90 degrees)×four times=360 degrees. In step S13a, processing equivalent to determination as to whether or not the cumulative angle of rotation is equal to or greater than 360 degrees (step S13) is performed by calculating the cumulative angle of rotation based on the number of times of drive in forward rotation drive and reverse rotation drive. When the operation in drive pattern b has been performed consecutively four times (YES in step S13a), control unit 11 carries out reverse rotation drive in which cutting tool 5 is rotated in the reverse direction by 180 degrees (step S15). Control unit 11 has cutting tool 5 driven in drive pattern b (step S11 to step S14), and when the cumulative amount of rotation is equal to or greater than the reference amount of rotation, the control unit changes the drive pattern to drive pattern c (step S15 to step S18). When change to drive pattern c is made, control unit 11 performs processing for rewriting a parameter such as an angle of rotation set in drive pattern b into a parameter such as an angle of rotation set in drive pattern c.

Then, control unit 11 determines whether or not an operation in drive pattern c has been performed consecutively four times (step S16a). When the operation in drive pattern c has not been performed consecutively four times (NO in step S16a), control unit 11 carries out forward rotation drive in which cutting tool 5 is rotated in the forward direction by 90 degrees (step S17). After control unit 11 has cutting tool 5 driven in the forward direction by 90 degrees, the load detector determines whether or not the load applied to cutting tool 5 is greater than the reference value (step S18). When the load applied to cutting tool 5 is greater than the reference value (YES in step S18), control unit 11 has the process return to step S15. When the load applied to cutting tool 5 is greater than the reference value, control unit 11 repeats drive in a drive pattern in which cutting tool 5 is rotated in the reverse direction by 180 degrees and in the forward direction by 90 degrees (drive pattern c shown in FIG. 13). Control unit 11 controls drive in drive pattern c in which cutting tool 5 is rotated in the reverse direction by 180 degrees and in the forward direction by 90 degrees as shown in FIG. 2C.

When the operation in drive pattern c has been performed consecutively four times (YES in step S16a), control unit 11 has the process return to step S11 unless it accepts a stop operation in step S19. Control unit 11 has cutting tool 5 driven in drive pattern c (step S15 to step S18), and when the cumulative amount of rotation is equal to or greater than the reference amount of rotation, the control unit changes the drive pattern back to drive pattern b (step S11 to step S14). When the drive pattern is changed back to drive pattern b, control unit 11 performs processing for rewriting a parameter such as an angle of rotation set in drive pattern c into a parameter such as an angle of rotation set in drive pattern b. When the operation in drive pattern c has been performed consecutively four times, drive in the reverse direction (−180 degrees)×four times and drive in the forward direction (90 degrees)×four times are carried out. Therefore, the cumulative angle of rotation is calculated as reverse direction (−180 degrees)×four times and forward direction (90 degrees)×four times=(−360 degrees). In step S16a, processing equivalent to determination as to whether or not the cumulative angle of rotation is equal to or smaller than (−360 degrees) (an absolute value of the cumulative angle of rotation being equal to or greater than the reference angle of rotation) (step S16) is performed by calculating the cumulative angle of rotation based on the number of times of drive in forward rotation drive and reverse rotation drive. When the load applied to cutting tool 5 is greater than the reference value, control unit 11 controls drive by switching between drive pattern b and drive pattern c each time the number of times of operations in drive patterns b and c does not exceed four consecutive times.

Therefore, in root canal treatment instrument 100, even though a load greater than the reference value is applied to cutting tool 5, drive is continued with the number of times of operations in drive patterns b and c being set within a range not exceeding the fracture angle, so that fracture of the cutting tool can be prevented while lowering in efficiency in cutting is suppressed as compared with control in which reverse rotation drive is carried out each time a load greater than the reference value is applied to cutting tool 5.

When the load applied to cutting tool 5 is not greater than the reference value (NO in step S18), control unit 11 determines whether or not it has accepted a stop operation (step S19). When the control unit has accepted the stop operation (YES in step S19), control unit 11 quits drive for rotating cutting tool 5. When the control unit has not accepted the stop operation (NO in step S19), control unit 11 has the process return to step S11.

(Modification)

Root canal treatment instrument 100 according to the present second embodiment configured to switch to drive pattern c when the operation in drive pattern b has been performed consecutively four times (YES in step S13a) has been described. The operation to be performed when the operation in drive pattern b has been performed consecutively four times is not limited only to switching between the drive patterns. In the present modification, an operation other than switching between the drive patterns will be described. FIGS. 14A to 14D are each a flowchart for illustrating drive of root canal treatment instrument 100 according to a modification of the present second embodiment. Since root canal treatment instrument 100 according to the modification of the present second embodiment also includes features the same as in root canal treatment instrument 100 according to the first embodiment shown in FIGS. 5 to 7, the same reference characters are allotted and detailed description will not be repeated. In the flowchart in the present modification shown in FIGS. 14A to 14D, steps the same as those in the flowchart in the present second embodiment shown in FIG. 13 have the same reference characters allotted and detailed description will not be repeated.

The flowchart shown in FIG. 14A illustrates processing in drive pattern b including step S11 to step S14, and FIGS. 14B to 14D show processing at the time when the operation in drive pattern b is performed consecutively four times (YES in step S13a).

Specifically, in FIG. 14B, when the operation in drive pattern b has been performed consecutively four times (YES in step S13a), control unit 11 stops drive (step S15b). Since drive can thus be stopped before cutting tool 5 reaches the fracture angle, fracture of cutting tool 5 due to torsional fracture can be prevented.

In FIG. 14C, when the operation in drive pattern b has been performed consecutively four times (YES in step S13a), control unit 11 issues a warning (step S15c). For example, control unit 11 controls notification unit 17 to emit light indicating warning from an LED or generate sound indicating warning from a speaker or controls display 16 to show warning for fracture. An operator may use the warning as indication of timing to eliminate bite of the cutting edge of cutting tool 5 into the wall of the root canal by pulling up handpiece 1 (pecking motion) at the timing of issuance of the warning. Though the process returns to step S19 after processing in step S15c in FIG. 14C, drive may be stopped after processing in step S15c.

In FIG. 14D, when the operation in drive pattern b has been performed consecutively four times (YES in step S13a), control unit 11 has cutting tool 5 driven in the reverse direction (step S15d). For example, control unit 11 has reverse rotation drive carried out in which cutting tool 5 is rotated in the reverse direction by 360 degrees. When the operation in drive pattern b has been performed consecutively four times, cutting tool 5 has been rotated in the forward direction by 360 degrees while the cutting edge of cutting tool 5 is bitten in the wall of the root canal, and hence bite of the cutting edge of cutting tool 5 can be eliminated by rotating the cutting tool in the reverse direction by 360 degrees. Though the process returns to step S19 after processing in step S15d in FIG. 14D, drive may be stopped after processing in step S15d.

As set forth above, in root canal treatment instrument 100 according to the present second embodiment, cumulative rotation angle calculator 80 calculates a cumulative angle of rotation based on the number of times of drive in forward rotation drive and reverse rotation drive. Therefore, root canal treatment instrument 100 according to the present second embodiment can control drive such that the cumulative angle of rotation is equal to or smaller than the reference angle of rotation without calculating the cumulative angle of rotation itself.

Predetermined control may be defined as control for stopping drive of cutting tool 5. Root canal treatment instrument 100 can thus more reliably prevent fracture of cutting tool 5 due to torsional fracture.

Root canal treatment instrument 100 further includes notification unit 17 configured to give a notification to a user, and predetermined control may be defined as control for notifying that a cumulative amount of rotation calculated by cumulative rotation angle calculator 80 is equal to or greater than a reference amount of rotation. Root canal treatment instrument 100 can thus call an operator's attention to fracture of cutting tool 5.

Predetermined control may be defined as control for driving cutting tool 5 in a direction reverse to a direction of rotation in which the cumulative amount of rotation calculated by cumulative rotation angle calculator 80 is equal to or greater than the reference amount of rotation. Root canal treatment instrument 100 can thus eliminate bite of the cutting edge of cutting tool 5 into the wall of the root canal.

Third Embodiment

Figure 15:
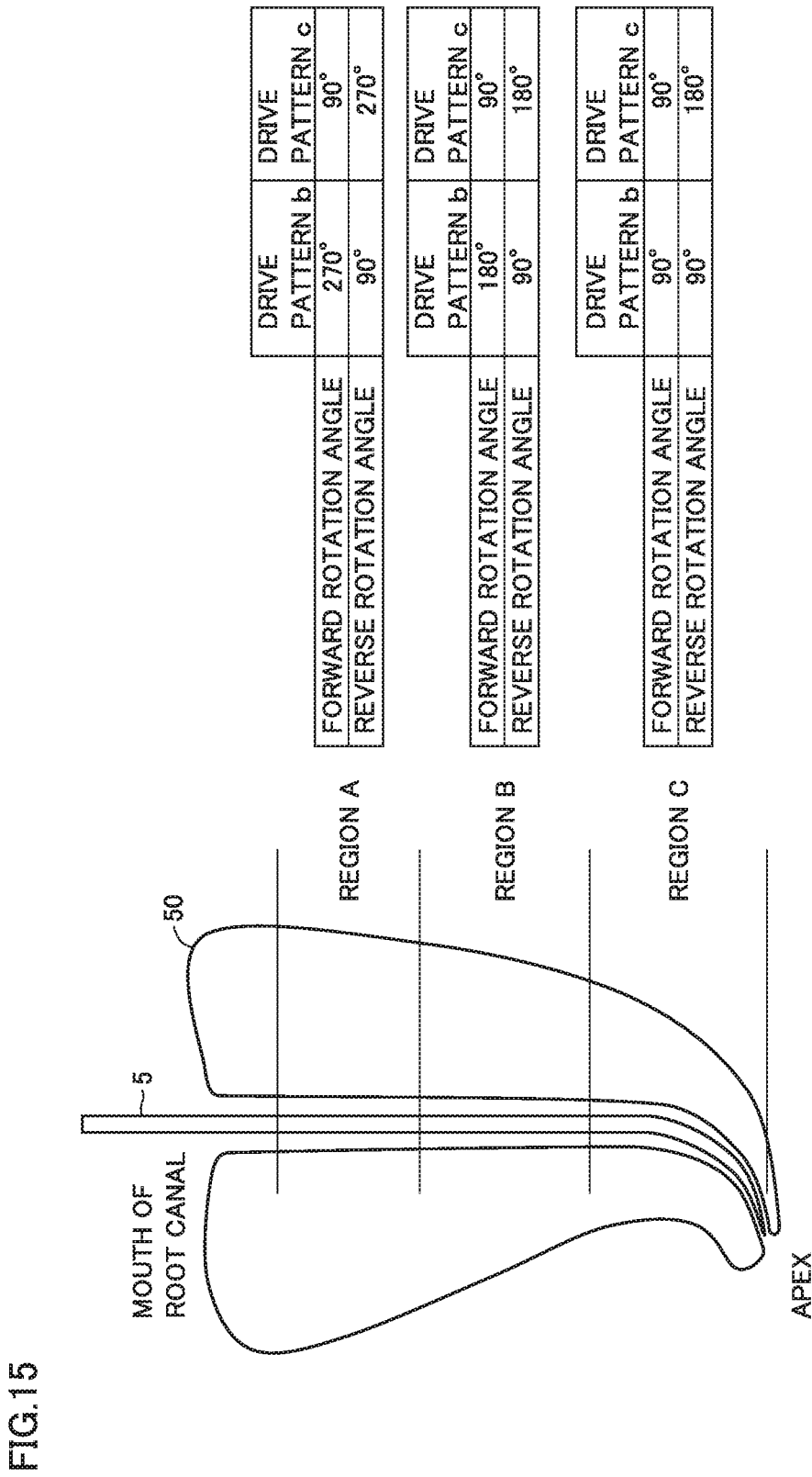
FIG. 15 is a schematic diagram for illustrating drive of the root canal treatment instrument according to the present third embodiment.

Control for carrying out the same drive in root canal treatment instrument 100 according to the first and second embodiments regardless of a position of cutting tool 5 in a root canal has been described. Without being limited as such, the root canal treatment instrument may carry out such control that a root canal of a tooth is divided into a plurality of regions and a parameter such as a reference value, a reference angle of rotation, an angle of rotation in forward rotation drive, and an angle of rotation in reverse rotation drive is changed depending on the region. FIG. 15 is a schematic diagram for illustrating drive of the root canal treatment instrument according to the present third embodiment. Since root canal treatment instrument 100 according to the present third embodiment also includes features the same as in root canal treatment instrument 100 according to the first embodiment shown in FIGS. 5 to 7, the same reference characters are allotted and detailed description will not be repeated.

In tooth 50 shown in FIG. 15, a root canal from a mouth of the root canal to the root apex is divided into three regions of an A region, a B region, and a C region. An example in which an angle of rotation in forward rotation drive and an angle of rotation in reverse rotation drive are changed depending on the region will be described below. Initially, when the tip end of cutting tool 5 is within the A region, control unit 11 controls drive pattern b in FIGS. 1 and 13 as drive in which cutting tool 5 is rotated in the forward direction by 270 degrees and in the reverse direction by 90 degrees and drive pattern c in FIGS. 1 and 13 as drive in which cutting tool 5 is rotated in the forward direction by 90 degrees and in the reverse direction by 270 degrees. In the A region close to the mouth of the root canal, the root canal is large in diameter and curved to a lesser extent. Therefore, control circuit 11 has cutting tool 5 driven with the angle of rotation in the forward direction being set to be large for enhancing efficiency in cutting.

Then, when the tip end of cutting tool 5 is within the B region, control unit 11 controls drive pattern b in FIGS. 1 and 13 as drive in which cutting tool 5 is rotated in the forward direction by 180 degrees and in the reverse direction by 90 degrees, and drive pattern c in FIGS. 1 and 13 as drive in which cutting tool 5 is rotated in the forward direction by 90 degrees and in the reverse direction by 180 degrees. In the B region, the root canal gradually becomes smaller in diameter and starts to curve. The B region, however, is still distant from the position of the root apex, and hence control circuit 11 has cutting tool 5 driven with the angle of rotation in the forward direction being set to be smaller while efficiency in cutting is taken into account.

Then, when the tip end of cutting tool 5 is within the C region, control unit 11 controls drive pattern b in FIGS. 1 and 13 as drive in which cutting tool 5 is rotated in the forward direction by 90 degrees and in the reverse direction by 90 degrees, and drive pattern c in FIGS. 1 and 13 as drive in which cutting tool 5 is rotated in the forward direction by 90 degrees and in the reverse direction by 180 degrees. In the C region close to the root apex, the root canal is small in diameter and greatly curved. Therefore, control circuit 11 has cutting tool 5 driven with the angle of rotation in the forward direction being set to be smaller than the angle of rotation in the reverse direction, in consideration of lowering in load imposed on cutting tool 5 rather than efficiency in cutting.

Though an example in which control unit 11 changes an angle of rotation in forward rotation drive and an angle of rotation in reverse rotation drive depending on a region where the tip end of cutting tool 5 is located is shown, limitation thereto is not intended. For example, control unit 11 may change the reference value, the reference angle of rotation, and the drive pattern depending on a region where the tip end of cutting tool 5 is located.

As set forth above, root canal treatment instrument 100 according to the present third embodiment further includes root canal length measurement circuit 12 configured to detect a position of the tip end of cutting tool 5 within the root canal by electrical measurement of a root canal length, and control unit 11 may change a value of at least one of the reference load, the reference angle of rotation, the first amount of rotation, the second amount of rotation, the third amount of rotation, and the fourth amount of rotation in accordance with the position detected by root canal length measurement circuit 12. Root canal treatment instrument 100 can thus carry out appropriate control in accordance with a position of the tip end of cutting tool 5 within the root canal so that fracture of cutting tool 5 due to torsional fracture can be prevented.

Control unit 11 may control the drive unit to carry out the reverse rotation drive or drive for performing a stop operation when the position detected by root canal length measurement circuit 12 reaches a reference position (for example, a position of the root apex). Cutting tool 5 can thus be prevented from erroneously advancing beyond the position of the root apex.

(Modification)

Figure 16:
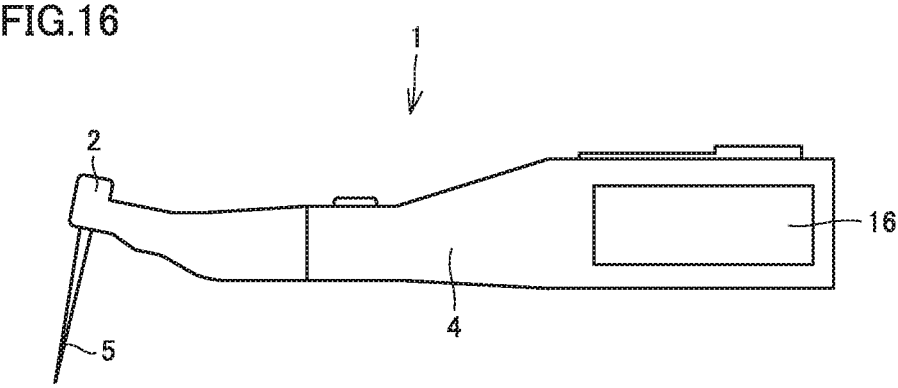
FIG. 16 is a schematic diagram showing a construction of a root canal treatment instrument of a cordless type.

Though the configuration of root canal treatment instrument 100 according to the first to third embodiments in which handpiece 1 is coupled to control box 9 through hose 61 has been described, the present invention is not limited as such and may be configured as a root canal treatment instrument of a cordless type. FIG. 16 is a schematic diagram showing a construction of a root canal treatment instrument of a cordless type. The root canal treatment instrument of the cordless type shown in FIG. 16 incorporates a battery pack, a micromotor, and a control system corresponding to a control box in grip 4 of handpiece 1, with various operation portions being provided on a surface of grip 4. The root canal treatment instrument of the cordless type further includes display 16 in grip 4. Therefore, an operator can check information such as whether cutting tool 5 is driven in the cutting direction or in the non-cutting direction, where cutting tool 5 is currently located, how much load is applied to cutting tool 5, or how high the number of rotations is, without greatly changing a line of sight. Though not shown, lead 19 for mouth cavity electrode 19a may be pulled out of grip 4.

Though micromotor 7 is employed as a source of motive power for driving cutting tool 5 in root canal treatment instrument 100 according to the first to third embodiments, the present invention is not limited as such and another drive source such as an air motor may be provided.

Control for carrying out the same drive regardless of a type of cutting tool 5 held by head 2 in root canal treatment instrument 100 according to the first to third embodiments has been described. Without being limited as such, root canal treatment instrument 100 may carry out such control that a parameter such as a reference value, a reference angle of rotation, an angle of rotation in forward rotation drive, and an angle of rotation in reverse rotation drive is changed in accordance with a type of cutting tool 5 held by head 2. For example, in a method of selecting a type of cutting tool 5 held by head 2, a type of cutting tool 5 is selected from among types of cutting tool 5 shown on display 16. Without selection by an operator of a type of cutting tool 5, root canal treatment instrument 100 may recognize a type of cutting tool 5 held by head 2 and automatically select the type of cutting tool 5 based on identification information (such as an electronic tag) provided in cutting tool 5.

Root canal treatment instrument 100 according to the first to third embodiments may be configured to select and set a parameter from a recipe storing a value of a parameter such as a reference value, a reference angle of rotation, an angle of rotation in forward rotation drive, and an angle of rotation in reverse rotation drive. For example, setting unit 14 may be configured to automatically set a value of a parameter from a predetermined recipe by selecting a sex or a height of a patient. Setting unit 14 may be configured to store in advance a value of a parameter preferred by an operator as a recipe or store in advance a value for a parameter optimal for each patient as a recipe.

Root canal treatment instrument 100 according to the first to third embodiments may be configured to set a value of a parameter such as a reference value, a reference angle of rotation, an angle of rotation in forward rotation drive, and an angle of rotation in reverse rotation drive in accordance with a value of a fracture angle or breaking torque by receiving input thereof.

In root canal treatment instrument 100 according to the first to third embodiments, control unit 11 may be able to change at least one of values of parameters such as a reference value, a reference angle of rotation, an angle of rotation in forward rotation drive, and an angle of rotation in reverse rotation drive. For example, specifications may be such that an operator can operate operation portion 15 to freely input values of parameters such as a reference value, a reference angle of rotation, an angle of rotation in forward rotation drive, and an angle of rotation in reverse rotation drive. According to such specifications, control unit 11 may be provided with a function to restrict an input parameter so as not to exceed a prescribed range, from a point of view of prevention of fracture of cutting tool 5 due to torsional fracture.

The angle of rotation in forward rotation drive may be at least close to any one of 90 degrees, 120 degrees, 150 degrees, and 180 degrees, and the angle of rotation in reverse rotation drive may be at least close to any one of 20 degrees, 30 degrees, 50 degrees, 90 degrees, 120 degrees, and 150 degrees.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A dental treatment apparatus comprising:
    a handpiece having a head to hold a cutting tool;
    a drive circuitry capable of forward rotation drive in which the cutting tool held by the head of the handpiece is rotated in a cutting direction and reverse rotation drive in which the cutting tool is rotated in a non-cutting direction;
    a control circuitry configured to control the drive circuitry configured to drive the cutting tool;
    a load detector configured to detect a load applied to the cutting tool; and
    a cumulative rotation amount calculator configured to calculate a cumulative amount of rotation which is a sum of angles of rotation of the cutting tool driven with the forward rotation drive and of angles of rotation of the cutting tool driven with the reverse rotation drive, wherein the angles of rotation in the forward rotation drive are represented by positive values and the angles of rotation in the reverse rotation drive are represented by negative valves, wherein the cumulative rotation amount calculator measures whether or not the cumulative amount of rotation is within a range not exceeding a fracture angle of the cutting tool,
    the control circuitry being configured to control a switching between drive patterns of the cutting tool, wherein
    in a first drive pattern, the control circuitry is configured to repeat drive of the cutting tool in the forward rotation drive by a predetermined first amount of rotation, while the load applied to the cutting tool and detected by the load detector is equal to or less than the reference load,
    the control circuitry switches the cutting tool from the first drive pattern to a second drive pattern when the load applied to the cutting tool and detected by the load detector is greater than the reference load, and
    in the second drive pattern, the control circuitry is configured to repeat drive of the cutting tool in the forward rotation drive by the predetermined first amount of rotation and the reverse rotation drive by a predetermined second amount of rotation that is smaller than the predetermined first amount of rotation, while the cumulative amount of rotation calculated by the cumulative rotation amount calculator is less than a reference amount of rotation, and the load applied to the cutting tool and detected by the load detector is continuously greater than the reference load,
    the control circuitry switches the cutting tool from the second drive pattern to a third drive pattern when the cumulative amount of rotation calculated by the cumulative rotation amount calculator is equal to or greater than the reference amount of rotation, and the load applied to the cutting tool and detected by the load detector is continuously greater than the reference load,
    in the third drive pattern, the control circuitry is configured to drive the cutting tool to eliminate twist therein by at least one of a) stopping drive of the cutting tool; b) driving the cutting tool in a direction reverse to a rotation direction in which the cumulative amount of rotation calculated by the cumulative rotation amount calculator is equal to or great than the reference amount of rotation; c) driving the cutting tool in the reverse rotation drive by a predetermined third amount of rotation and the forward rotation drive by a predetermined fourth amount or rotation that is smaller than the predetermined third amount of rotation, while the cumulative amount of rotation calculated by the cumulative rotation amount calculator is greater than the reference amount of rotation, and the load applied to the cutting tool and detected by the load detector is continuously greater than the reference load; d) driving the cutting tool in the forward rotation drive or the reverse rotation drive such that the cumulative amount of rotation calculated by the cumulative rotation amount calculator attains or is close to zero; or e) driving the cutting tool in the forward rotation drive or the reverse rotation drive such that the cumulative amount of rotation calculated by the cumulative rotation amount calculator is smaller than the reference amount of rotation.

2. The dental treatment apparatus according to claim 1, wherein the third drive pattern comprises stopping drive of the cutting tool.

3. The dental treatment apparatus according to claim 1, further comprising a display configured to give a notification to a user, wherein
    the display notifies that the cumulative amount of rotation calculated by the cumulative rotation amount calculator is equal to or greater than the reference amount of rotation.

4. The dental treatment apparatus according to claim 1, wherein
    the third drive pattern comprises driving the cutting tool in a direction reverse to a rotation direction in which the cumulative amount of rotation calculated by the cumulative rotation amount calculator is equal to or greater than the reference amount of rotation.

5. The dental treatment apparatus according to claim 1, wherein
    the third drive pattern comprises repeating drive of the cutting tool in the reverse rotation drive by a predetermined third amount of rotation and the forward rotation drive by a predetermined fourth amount of rotation that is smaller than the predetermined third amount of rotation, while the cumulative amount of rotation calculated by the cumulative rotation amount calculator is greater than the reference amount of rotation, and the load applied to the cutting tool and detected by the load detector is continuously greater than the reference load.

6. The dental treatment apparatus according to claim 5, wherein
the control circuitry switches the cutting tool from the third drive pattern to the first drive pattern when the cumulative amount of rotation calculated by the cumulative rotation amount calculator is less than the reference amount of rotation.

7. The dental treatment apparatus according to claim 1, wherein the third drive pattern comprises driving the cutting tool in the forward rotation drive or the reverse rotation drive such that the cumulative amount of rotation calculated by the cumulative rotation amount calculator attains or is close to zero.

8. The dental treatment apparatus according to claim 1, wherein the third drive pattern comprises driving the cutting tool in the forward rotation drive or the reverse rotation drive such that the cumulative amount of rotation calculated by the cumulative rotation amount calculator is smaller than the reference amount of rotation.

9. The dental treatment apparatus according to claim 1, wherein
the control circuitry can change a value of at least one of the reference load, the reference amount of rotation, the first amount of rotation, and the second amount of rotation.

10. The dental treatment apparatus according to claim 5, wherein
the control circuitry can change a value of at least one of the reference load, the reference amount of rotation, the first amount of rotation, the second amount of rotation, the third amount of rotation, and the fourth amount of rotation.

11. The dental treatment apparatus according to claim 1, wherein
the first amount of rotation is at least any one of 90 degrees, 120 degrees, 150 degrees, and 180 degrees, and the second amount of rotation is at least any one of 20 degrees, 30 degrees, 50 degrees, 90 degrees, 120 degrees, and 150 degrees.

12. The dental treatment apparatus according to claim 1, wherein
the reference amount of rotation is set based on the fracture angle of the cutting tool.

13. The dental treatment apparatus according to claim 1, wherein
the control circuitry can change the reference amount of rotation in accordance with a type of the cutting tool.

14. The dental treatment apparatus according to claim 1, further comprising a position detector configured to detect a position of a tip end of the cutting tool within a root canal by electrical measurement of a root canal length, wherein
the control circuitry is configured to change a value of at least one of the reference load, the reference amount of rotation, the first amount of rotation, and the second amount of rotation in accordance with the position detected by the position detector.

15. The dental treatment apparatus according to claim 5, further comprising a position detector configured to detect a position of a tip end of the cutting tool within a root canal by electrical measurement of a root canal length, wherein
the control circuitry is configured to change a value of at least one of the reference load, the reference amount of rotation, the first amount of rotation, the second amount of rotation, the third amount of rotation, and the fourth amount of rotation in accordance with the position detected by the position detector.

16. The dental treatment apparatus according to claim 14, wherein
the control circuitry is configured to control the drive circuitry to carry out the third drive pattern when the position detected by the position detector reaches a reference position.

17. The dental treatment apparatus according to claim 1, wherein
the cumulative rotation amount calculator calculates the cumulative amount of rotation based on the number of times of drive in the forward rotation drive and the reverse rotation drive.

18. The dental treatment apparatus according to claim 14, wherein
the cumulative rotation amount calculator resets the calculated cumulative amount of rotation to zero when the position detector detects removal of the cutting tool from the root canal or raise of the position of the tip end of the cutting tool in the root canal to a predetermined position.

* * * * *